(12) United States Patent
Kundu et al.

(10) Patent No.: US 8,462,212 B1
(45) Date of Patent: Jun. 11, 2013

(54) CORRELATING DETECTED EVENTS WITH IMAGE DATA

(75) Inventors: Malay Kundu, Lexington, MA (US); Joshua Migdal, Wayland, MA (US); Vikram Srinivasan, Billerica, MA (US); Matthew Farrow, Canton, MA (US)

(73) Assignee: Stoplift, Inc., Cambridge, MA (US)

( * ) Notice: Subject to any disclaimer, the term of this patent is extended or adjusted under 35 U.S.C. 154(b) by 453 days.

(21) Appl. No.: 12/685,517

(22) Filed: Jan. 11, 2010

Related U.S. Application Data

(63) Continuation-in-part of application No. 12/328,585, filed on Dec. 4, 2008.

(60) Provisional application No. 61/143,544, filed on Jan. 9, 2009.

(51) Int. Cl.
 *H04N 7/18* (2006.01)
 *H04N 9/475* (2006.01)

(52) U.S. Cl.
 USPC .......................................... 348/150; 348/512

(58) Field of Classification Search
 None
 See application file for complete search history.

(56) References Cited

U.S. PATENT DOCUMENTS

| | | | |
|---|---|---|---|
| 5,745,036 A | 4/1998 | Clare | |
| 5,965,861 A | 10/1999 | Addy et al. | |
| 7,049,965 B2 | 5/2006 | Kelliher et al. | |
| 7,080,778 B1 | 7/2006 | Kressin et al. | |
| 7,118,026 B2 | 10/2006 | Harris et al. | |
| 7,388,495 B2 * | 6/2008 | Fallin et al. | 340/572.1 |
| 7,416,118 B2 | 8/2008 | Throckmorton et al. | |
| 2003/0197782 A1 * | 10/2003 | Ashe et al. | 348/150 |
| 2004/0130623 A1 * | 7/2004 | Han | 348/150 |
| 2004/0164863 A1 * | 8/2004 | Fallin et al. | 340/572.1 |
| 2006/0104479 A1 * | 5/2006 | Bonch-Osmolovskiy et al. | 382/103 |
| 2006/0171452 A1 * | 8/2006 | Waehner | 375/240.01 |
| 2007/0008102 A1 * | 1/2007 | Fallin et al. | 340/506 |
| 2008/0218591 A1 * | 9/2008 | Heier et al. | 348/150 |
| 2011/0191195 A1 * | 8/2011 | Lipton et al. | 705/16 |

* cited by examiner

*Primary Examiner* — Mohamed Ibrahim
*Assistant Examiner* — Thomas Richardson
(74) *Attorney, Agent, or Firm* — Chapin IP Law, LLC

(57) ABSTRACT

According to one configuration, a computer environment includes a first monitoring system, a second monitoring system, and an analyzer. The first monitoring system produces video of an item being entered into a point of sale system. The second monitoring system monitors events associated with entering of the item into the point of sale system. The analyzer detects, via a communication from the second monitoring system, an occurrence of at least one event associated with entering of the item. Based on communication, the analyzer correlates the at least one event to a particular time in the video when the at least one event occurred.

28 Claims, 19 Drawing Sheets

| | EVENT CLOCK | VIDEO CLOCK | DELTA (SECONDS) |
|---|---|---|---|
| ... | ... | ... | ... |
| HB#11 | 11:53:00.000 | 11:54:06.158 | 66.158 |
| HB#12 | 11:54:00.000 | 11:55:06.256 | 66.256 |
| HB#13 | 11:55:00.000 | 11:56:06.298 | 66.298 |
| ... | ... | ... | ... |

CLOCK INFORMATION 115-1

CLOCK INFORMATION 115-2

FIG. 4

CORRELATING DETECTED EVENTS WITH IMAGE DATA

RELATED APPLICATIONS

This application is related to and claims the benefit of earlier filed U.S. Provisional Patent Application Ser. No. 61/143,544 entitled "SYNCHRONIZING POINT OF SALE DATA EVENTS WITH VIDEO," filed on Jan. 9, 2009, the entire teachings of which are incorporated herein by this reference.

This application is a continuation in part and claims priority to earlier filed U.S. patent application Ser. No. 12/328,585 entitled "ANONYMIZATION AND SYNCHRONIZATION BASED ON USE OF PROTECTED CONTENT," filed on Dec. 4, 2008, the entire teachings of which are incorporated herein by this reference.

BACKGROUND

Retail establishments commonly utilize point of sale or other transaction terminals, such as cash registers, to allow customers of those establishments to purchase items.

As an example, in a conventional department store, supermarket or other retail establishment, a customer collects items for purchase and places the items in a shopping cart, basket, or simply carries them to a point of sale terminal to purchase those items in a transaction. The point of sale terminal may be staffed with an operator such as a cashier who is a person employed by the store to assist the customer in completing the sales transaction. In some cases, retail establishments have implemented self-checkout point of sale terminals in which the customer is the operator and scans his items for purchase. In either case, the operator typically places items for purchase on a counter, conveyor belt or other item input area.

Point of sale terminals typically include a scanning device such as a laser or optical scanner system that operates to identify a Uniform Product Code (UPC) label or bar code affixed to each item that the customer desires to purchase. The laser scanner is usually a peripheral device coupled to a computer that is part of the POS terminal.

To scan an item, an operator picks up each item, one by one, from the item input area such as a conveyor and passes each item over a scanning area such as glass window built into the counter or checkout area to allow the laser scanner to detect the UPC code. After the point of sale computer identifies the UPC code of an item, the point-of-sale scanning terminal performs a lookup in a database to determine the price and identity of the scanned item. Alternatively, in every case where the operator can scan the item, the operator may likewise enter the UPC or product identification code into the terminal manually or through an automatic product identification device such as an RFID reader.

As the operator scans or enters each item for purchase, one by one, the point of sale terminal maintains an accumulated total purchase price for all of the items in the transaction. For each item that an operator successfully scans or enters, the point of sale terminal typically makes a beeping noise or tone to indicate to the operator that the item has been scanned by the point of sale terminal and in response, the operator places the item into an item output area such as a downstream conveyor belt or other area for retrieval of the items by the customer or for bagging of the items into a shopping bag. As well known, after all items in the transaction are scanned in this manner, the operator indicates to the point of sale terminal that the scanning process is complete and the point of sale terminal displays a total purchase price to the customer who then pays the store for the items purchased in that transaction.

These conventional systems that provide for purchase of items using an automated item identification systems such as a scanner suffer from a variety of deficiencies. In particular, operation of such systems can be compromised, either knowingly or unknowingly, by an operator in a manner that allows a customer to receive possession of one or more items without paying for them. For example, such scanning systems are susceptible to "pass-throughs," also know as "sweethearting" in which an operator purposefully or accidentally fails to scan an item as that item moves through the transaction area. In such cases, the POS system never detects the un-scanned item and the item is thus never totaled into the purchase price. Thus, the customer can receive one or more items for free. Retail chains lose millions of dollars a year to operator error or fraudulent activity of this nature.

In a non-fraudulent example, an operator may unknowingly pass an item through the scanning area during a transaction and place the item into the item output area such as a downstream conveyor belt, but no scan of the item took place. Perhaps the operator was not paying attention and did not notice (or did not care) that the scanner failed to beep during scanning of an item.

As an example of "sweethearting" that represents fraud on the retail establishment, an operator assists a customer who is personally known to the operator (e.g. a friend or conspirator of the operator). The scan operator intentionally passes the item over a scan window without the item being detected by the scanner. One way to prevent proper scanning is to cover the UPC label as it is passes by the scanner's detection window. In such a situation, the item is included with other items that may or may not have also been scanned, and the customer or operator continues along with a transaction as if the item was properly scanned. After the operator processes all items in the transaction, either via actual scanning which is often done for the less expensive items to make the transaction look legitimate to anyone who may be watching, or via sweethearting in which case the item not scanned is grouped with items that appear to have be scanned, the customer pays the operator a purchase price reflecting only the sum total of the scanned items. After paying, the customer leaves the store with all items, having only paid for those items that were properly scanned or entered into the POS system.

In another fraudulent example known as label switching, the operator causes the POS system to scan an item that is different that the item being passed through the scanning area during the transaction. In such cases, a customer or operator may replace a UPC label of an original and often expensive item with a UPC label for another less expensive item. In such cases, a scan takes place but the wrong item is identified by the POS system. In this manner, the system will scan the item for a price that is substantially lower that the value of the item received by the customer.

Security system designers have attempted to develop conventional techniques for detecting fraudulent or accidental operator error in use of POS terminals. The conventional systems in the field of detection of pass-through and sweehearting provide for the detection of abnormally long "scan-gaps". A "scan-gap" is the amount of time between consecutive scans at the point of sale terminal. When an item is passed through without scanning, the scan-gap increases until the next scan. By comparing the scan-gaps between scanned items of a transaction versus the average scan-gap for a given employee operator, the conventional scan-gap method seeks to identify incidents when an item has bypassed the scanner without being scanned.

The conventional scan-gap detection method is widely regarded to be impractical, as scan-gaps have been found to be a "noisy" measure at best. This is due to the fact that perfectly legitimate scan-gaps may vary widely due to delays such as those caused by weighing of produce, manual entry of unlabeled or un-scannable goods, and rescanning of items that did not get scanned on the first pass. As a result, scan-gaps are not a dependable metric for determining improper activity. Thus, conventional systems that attempt to use scan gaps as a method for detecting fraudulent activity are prone to problems.

Other conventional systems include a surveillance camera to record an in-person sales transaction on video. In such an instance, the video can be reviewed at a later time in the store to determine whether there were any scan errors associated with a particular sales transaction.

BRIEF DESCRIPTION

One conventional approach to automatically monitor and detect theft in a retail environment includes analyzing security video of items being scanned at a register. Based on a manual review and careful comparison of video data and a list of items that were scanned at the register, the video data from a surveillance camera can be correlated with the data from a cash register to determine indicated which items were, indeed, scanned for purchase. Discrepancies between the video data as captured by a security camera and the data from the registers may indicate that fraudulent activity may be taking place.

One of the challenges associated with correlating video data with a confirmation by the scanner that the item was properly scanned is that the two independent sources generating this information need to be synchronized. For example, in order to match item scan data from a cash register to corresponding video frames requires that the cash register and the surveillance camera operate off of the same clock. Such an option is impractical if not impossible in real world applications. That is, the surveillance camera clock is independent of the POS system clock. Given the difference in clocks, it is often difficult to manually correlate scan data from a register with video surveillance footage.

In certain cases, note that a conventional register's scanner may indicate only down to a second resolution when the item was scanned relative to a scanner clock. In other cases, the conventional scanner may not even provide any indication whatsoever when an item was scanned during checkout.

As discussed above, various approaches to solving the synchronization problems have been proposed. For example it is possible to monitor data traffic on a network to which the POS register is attached. However, it is often the case that the POS register will not send information in a timely manner across a network when a scan occurs. In other words, there can be a substantial latency associated with a time of identifying that a scan takes place at scanner system and a time of sending a message over a network to indicate occurrence of the scan. Accordingly, by itself, monitoring network traffic and time-stamping detected events may not be useful.

Furthermore, even if a POS communicates across a network at the time of each scan, due to the closed nature of such a respective communication system, it may be difficult for a monitoring system to decipher contents of the network messages and generate notification at an appropriate time. Moreover, the network traffic in a point of sale system may be secured to prevent snooping. Accordingly, in this last instance, it can be difficult to detect which data produced by a scanner of other device is useful for reporting of an event.

One possible approach to solving this problem is to work closely with POS vendors in order to understand their communication protocols or to integrate with the various POS manufacturers in order to obtain the desired real-time network communication needed to synchronize video and register data. However, such integration is often costly and time consuming. And, since there are many POS manufacturers in use today, this strategy could become prohibitively expensive.

As discussed above, reconciling item scan data with frames of corresponding video may be difficult or impossible since the system clocks associated with a point-of-sale transaction (or different nodes in a network) are typically not synchronized with system clocks of the surveillance camera used to gather the video. Because the clocks are not synchronized as discussed above, it is typically difficult for a reviewer to accurately map events associated with scanning of an item at a scanner to corresponding times or locations in the video.

In contrast to conventional techniques, embodiments herein include a monitoring system configured to monitor events associated with scanning of one or more items at a scanner system. For example, embodiments herein include an analyzer system in communication with a first monitoring system and a second monitoring having different system clocks. The analyzer system can be configured to receive, from a first monitoring system, video frame information of an item being scanned at a scanner system. The analyzer can be configured to detect, via one or more communications from a second monitoring system, an occurrence of at least one event associated with scanning of the item at the scanner system.

By way of a non-limiting example, the second monitoring system can be located in a retail environment in which items are scanned for purchase. In such an embodiment, the second monitoring system can be configured to monitor inputs and/or outputs of one or more sources in the retail environment to detect occurrence of scan or other type of events occurring at checkout.

For example, in one embodiment, the second monitoring system can be coupled via a link (e.g., wireless or wired link) to an input of a point of sale system such as a communication port of a scanner system used to scan an item for purchase (or keyboard used to hand-enter an item for purchase). The communication port can be a link on which the scanner system communicates with a point of sale system such as a point of sale cash register. The second monitoring system can monitor messages generated by the any of one or more different sources to detect events such as entry of an item into a point of sale system. Upon receipt of such a signal from the port indicating occurrence of an event, the second monitoring system forwards an event notification to the analyzer system.

In another embodiment, the second monitoring system can be coupled to an output such as a printer port of a point of sale cash register used to purchase an item. In such an embodiment, the second monitoring system monitors the printer port for communications. The printer port supports transmission of communications to one or more peripheral devices connected to the point of sale cash register. Upon receipt of a signal from the point of sale cash register (i.e., point of sale system) indicating occurrence of the event, the second monitoring system forwards the event notification to the analyzer system.

In yet another embodiment, the second monitoring system can include an audio sensor to detect an audible tone generated by the scanner system. The audible tone can indicate that an item has been properly scanned by the scanner system. Upon detection of the audible tone, the second monitoring system generates a notification of the audible tone event and forwards the event notification to the analyzer system.

In yet further embodiments, the second monitoring system can monitor motion of a hand across a scan window. The detected motion can correspond to passing of an item over or passed a scan window of the scanner system and placing of an item in a shopping bag. Upon detection of such a motion, the second monitoring system can generate a notification of the motion event and forward the event notification (e.g., motion of the hand) to the analyzer system.

According to one embodiment, the second monitoring transmits the event notifications over a low latency network. For example, a delay of transmitting the event notifications over the low latency network can be negligible. Upon receipt of the notifications, an event notification manager associated with the analyzer system generates a time stamp relative to a video clock when the event notification was received from the second monitoring system.

In addition to receiving the event notifications and time stamping the notifications based on the video clock, the analyzer according to embodiments herein can store video of the item being scanned at the scanner system. Frames of the video can be assigned timestamps generated by the video clock. Accordingly, the events detected by the second monitoring system can be correlated directly to respective video frames based on the time stamps assigned to the event notifications. Accordingly, if a user desires to view video taken at a time of a particular event as detected by the second monitoring system, the analyzer need only to identify a time stamp of the particular event notification (and when it occurred relative to the video clock) and retrieve one or more frames of video around a specific video frame that was been stamped with the identified timestamp of the event.

The monitoring system according to embodiments herein can monitor any number of one or more suitable sources (in addition to those as discussed above) for detecting occurrence of different types of events in the scan environment.

In one embodiment, the second monitoring system is configured to transmit the event notification over a variable latency network. In such an embodiment, the clock of the second monitoring system and the video clock may not be synchronized with each other. In accordance with such an embodiment, to correlate an event detected by the second monitoring system to a particular time in the video where the at least one event occurred, the analyzer system can utilize so-called heartbeat signals or communications (or other communications containing or logging associated timestamps) received from the second monitoring system to derive an offset value representing a time difference between the event clock and video clock.

For example, in one embodiment, the analyzer can receive and store the video and corresponding timing information for the video based on a first system clock (e.g., a video clock) as previously discussed. The second monitoring system may operate off a second system clock, which is independent of the first system clock. The second monitoring detects occurrence of events and time stamps the events based on the second system clock. To account for differences between the first and second clocks and identify precisely a time or location in the video when an event occurred, the analyzer can utilize clock information derived from received heartbeat communications to calculate a time skew between the first clock and the second clock. Via a derived offset value based on heartbeat or other signaling, the analyzer can accurately correlate a detected event to a point in the video where the event occurred.

In one embodiment, the heartbeat signals received from the second monitoring system include timing information enabling indexing of events as detected by the second monitoring system to frames of video generated by the first monitoring system. Details of such an embodiment are presented in more detail as discussed below.

It is possible that the first clock and second clock drift over a course of a day. In one embodiment, the analyzer creates a table or mapping indicating a skew or time difference between the first clock and the second clock based on the heartbeat signals and/or related messaging between the analyzer and the second monitoring system. Accordingly, upon receipt of the time-stamped events from the second monitoring system, the analyzer can access the clock information and convert the time stamp of the detected event (as stamped from the second clock) into a corresponding corrected timestamp relative to the first clock. The corresponding corrected time stamp can then be used to accurately identify a particular time in the video where the event occurred.

Accordingly, embodiments herein can facilitate detection and review of activity such as sweethearting or pass-throughs in a retail environment. In particular, the system disclosed herein can specify locations or times in a video sequence where incidents such as theft or loss of inventory occur at a point-of-sale transaction terminal.

For example, the events and corresponding video can be reviewed by an automated system that analyzes pixels of the video to identify possible fraudulent activity such as when a customer or store employee passes one or more items around the scanner (or RFID reader) without being scanned, or when the operator scans or manually enters an incorrect code into the transaction terminal for an item. If necessary, the time-stamped events and video data also can be reviewed manually by persons that study the video at the different scan times to identify whether an abuse has occurred.

These and other embodiments will be discussed in more detail below.

As mentioned above, note that embodiments herein can include a configuration of one or more computerized devices, workstations, handheld or laptop computers, or the like to carry out and/or support any or all of the method operations disclosed herein. In other words, one or more computerized devices or processors (such as a monitoring system, analyzer, etc.) can be programmed and/or configured to operate as explained herein to carry out different embodiments of the invention.

Yet other embodiments herein include software programs to perform the steps and operations summarized above and disclosed in detail below. One such embodiment comprises a computer program product that has a computer readable storage medium including computer program logic encoded thereon that, when performed in a computerized device having a processor and corresponding memory, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes computer readable storage media having instructions stored thereon for supporting operations such as those as described herein. The instructions, when carried out by a processor of a respective computer device, cause the processor to: receive, from a first monitoring system, video capturing an item being scanned at a scanner system; detect, via a communication from a second monitoring system, an occurrence of at least one event associated with scanning of the item at the scanner system; and correlating the at least one event to a particular time or location in the video where the at least one event occurred. Note that the ordering of the steps has been added for clarity sake; these steps can be executed in any suitable order.

Other embodiments of the present disclosure include software programs to perform any of the method embodiment steps and operations summarized above and disclosed in detail below.

Also, it is to be understood that the embodiments herein can be a software program, a combination of software and hardware, or as hardware alone. Example embodiments of the invention may be implemented within computer systems, processors, and computer program products and/or software applications manufactured by Stoplift, Inc. of Cambridge, Mass., USA.

As discussed above, techniques herein are well suited for use in point-of-sale transaction such as those in which an agent scans a respective item at checkout. However, it should be noted that embodiments herein are not limited to use in such applications and that the techniques discussed herein are well suited for other applications as well.

Additionally, although each of the different features, techniques, configurations, etc., herein may be discussed in different places of this disclosure, it is intended that each of the concepts can be executed independently of each other or, where suitable, in combination with each other. Accordingly, the one or more present inventions as described herein can be embodied and viewed in many different ways.

The brief description of the disclosure does not specify every embodiment and/or incrementally novel aspect of the present disclosure or claimed invention(s). Instead, this brief description of embodiments herein only provides a preliminary discussion of different embodiments and corresponding points of novelty. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FIG. 4 is an example diagram of clock information for adjusting time stamps according to embodiments herein.

DETAILED DESCRIPTION

According to one embodiment, an analyzer system receives communications from a first monitoring system and a second monitoring having different system clocks. For example, a first monitoring system produces the video based on a first clock. The second monitoring records occurrence of events based on a second clock. The first clock and second clock drift apart over time but can be occasionally adjusted so they are approximately synchronized with each other.

The analyzer system according to embodiments herein can be configured to receive, from the first monitoring system, video of an item being scanned at a scanner system. The analyzer also can be configured to detect, via a communication from a second monitoring system, an occurrence of at least one event associated with scanning of the item at the scanner system. Event notifications from the second monitoring system can be sent to the analyzer over a variable latency network. Thus, there may be a considerable time delay between a time of sending an event notification from the second monitoring system to the analyzer. Based at least in part on at least one heartbeat signal communication (or other communication with contained or logged timestamp) received from the second monitoring system and clock information derived from one or more heartbeat communications, the analyzer calculates a time difference between the system clocks at a time of the event. Via the calculated time difference, the analyzer can adjust the original time stamp associated with an event and, via the adjusted time stamped event, correlate the at least one event to a more precise time or location in the video where the at least one event occurred.

These and other embodiments are discussed in more detail below.

Figure 1:
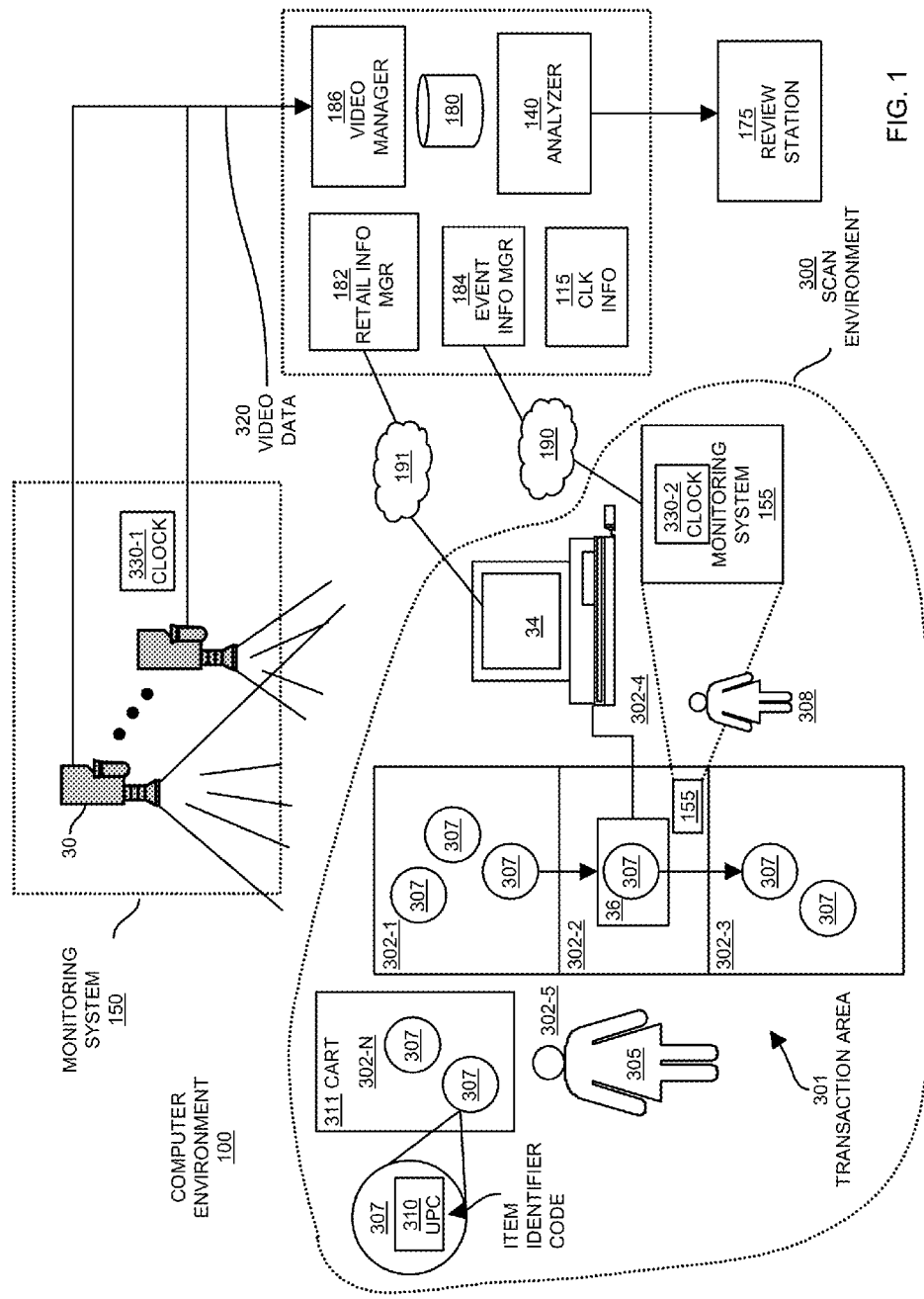
FIG. 1 is an example diagram of a computer environment including a monitoring system for monitoring a scanner environment according to embodiments herein.

FIG. 1 is an example diagram of a computer/network environment 100 including a point-of-sale terminals, scanners, and camera surveillance systems according to embodiments herein.

For example, environment 300 depicts a retail establishment in which customers 305 can purchase items 307. A transaction terminal 34 such as a point-of-sale terminal or cash register is under control of an operator 308 such as a store employee to allow the customer 305 to purchase and/or return the items 307. The point of sale terminal and/or scanner system 36 are used to enter an item 307 into the point of sale system. That is, the a scanner, handheld device, keyboard, etc., can be used to input data into the point of sale for identification of the item.

The transaction terminal 34 includes a scanning system 36 that is able to detect and scan or otherwise read item identities 310, such as UPC barcode symbols or RFID tags affixed to each item 307 when those items 307 are brought within a predetermined proximity of the scanner system 36.

The term "scan" or "enter" as described herein is generally defined to include all means of entering transaction items into a transaction terminal. Likewise, the term "scanner" is defined generally as any transaction terminal, automated and/or manual, for recording transaction information. In one embodiment, scans are performed at checkout or return of an item.

In a typical operation of the environment 300, the customer 305 approaches the transaction area 301 with a set of items 307 to be purchased. The items 307 may be contained, for example, within a shopping cart 311 or other item carrier transported by the customer 305 to the transaction area 301. Alternatively, the customer 305 may carry the individual items 307 to the transaction area 301.

To purchase items 307, the customer 305 removes the items 307 from shopping cart 311 (or from their hands if carrying the items) and places the items into an item input region generally designated as region 302-1 within the transaction area 301. The item input region 302-1 may be a conveyor belt, countertop or other surface area onto which items to be purchased are placed prior to being detected and read by the scanner system 36 of the transaction terminal 34.

The operator 308 such as a store employee interacts with the transaction terminal 34 by logging in or otherwise activating the transaction terminal 34. This process may involve the operator 308 providing a unique operator identity such as a password to the transaction terminal 34 in order to operate scanner 36 and transaction terminal 34.

During operation of the transaction terminal 34 by the operator 308, the operator 308 generally remains within an operator region 302-4 of the transaction area 301 to scan items 307. For example, after logging in, the operator 308 can begin selecting items 307 from input region 302-1, such as by picking up the individual items 307 by hand. The operator 308 passes each item 307 from the item input region 302-1 over the scanner system 36 generally located within an item read region 302-2. Assuming proper (i.e., non-fraudulent and non-error) operation by the operator 308, the operator 308 positions the item 307 such that the item identities 310 (e.g., code information) affixed to the item can be detected by the scanner system 36.

Note that identity 310 (e.g., bar code, SKU number, etc.) is shown by way of non-limiting example only and that any of items can include other identifier means such as an RFID tag that provides identity information over a wireless medium to scanner.

In response to the scanner system 36 detecting an item identity 310 of the item 307 just scanned, the transaction terminal 34 register detects, based on a valid scan, the item to be purchased and usually produces a notification to the operator 308 such as a beeping noise or tone to indicate that the item 307 has been successfully identified. In response to the notification, the operator 308 moves the item 307 into the item output region 302-3 which may be another countertop, downstream conveyor belt or the like that holds items 307 to have been successfully scanned or read by or entered into the transaction terminal 34.

As mentioned above, successful scanning and detecting of the item 307 over window or detection area of scanner system 36 can result in generation of one or more messages transmitted over network 191 to retail information manager 182. Retail information manager 182 initiates storage of item information associated with purchase of an item. The information can include identity of an item being purchased, price, quantity, etc.

Note that network 191 can be a private network or point of sale network and/or related infrastructure operated by a retail establishment to keep track of purchased items and/or facilitate purchase of items. The transaction terminal 34 can be a part of the point of sale system facilitating purchase of items 307.

The operator 308 repeats the process of scanning each individual item 307 such that all items 307 to be purchased are moved from the item input region 302-1, over or through the item read region 302-2 (during which scanning of the item takes place) and into the item output region 302-3.

In some cases, items 307 may not contain an affixed item identity 310 such as fruit, vegetables or the like. In such cases, after removal of the item 307 from the item input region 302-1, the operator 308 manually enters the item identity into the transaction terminal 34, a keyboard, or other manual input device to allow the transaction terminal 34 to register the item 307.

In this manner, after all items 307 have been identified to the transaction terminal 34, the operator 308 can indicate to the transaction terminal 34 that the transaction is complete and the transaction terminal 34 calculates the total price of the items 307 being purchased. The customer 305 then provides payment in that amount to the operator 308 and proceeds to remove the items 307 from the item output region 302-3 for transport out of the retail establishment. As mentioned above, retail information manager 182 receives and stores detailed information associated with a transaction such as a number of items, identity of items, sale price, etc.

In one embodiment, environment 300 includes monitoring system 150. Monitoring system 150 can be configured to include a video source 30 such as one or more overhead video surveillance cameras that capture video of the transaction area 301 while the operator scans items 307 via scanner system 36. The video source 30 can be mounted in an elevated position sufficiently above the transaction area 301 to cover and capture video from the various regions 302. Accordingly, the monitoring system 150 can produce video of items being scanned at scanner system 36.

Monitoring system 150 can include clock 330-1. Video source 30 can produce frames of video of items being scanned by scanner system 36. In one embodiment, the monitoring system produces tags, timestamps, etc. for the frames of video based on clock 330-1. The timestamps of the video enable quick searching of particular frames of interest for playback to a user as will be discussed later in this specification.

Monitoring system 150 transmits the video generated by video source 30 to manager 186. Video manager 186 stores the frames of video and related clock information in repository 180.

In addition to monitoring system 150, scan environment 300 can be configured to include monitoring system 155. In one embodiment, monitoring system 155 can be an add-on device that connects (via a wired or wireless link) to any of one or more conventional systems that are used to facilitate a purchase of items in a retail setting. In another embodiment, the monitoring system 155 operates as an independent device that monitors the occurrence of different events independent of other systems present in the scan environment.

Monitoring system 155 monitors occurrence of events associated with entry of an item into the point of sale system. By way of a non-limiting example, entry of an item into the point of sale system can include scanning of items at scanner system 36, inputting data about the item into a keyboard, etc. As discussed herein, the events detected by event monitoring system 155 can be correlated to respective frames of video produced by video monitoring system 150.

Note that the monitoring system 155 can monitor one or more sources in scan environment 300 to detect occurrence of scan events occurring at checkout. The sources can reside external to a point of sale network or device. In certain cases, it is desirable to protect the point of sale data and detect occurrence of events outside a point of sale environment.

In one embodiment, the monitoring system 155 is configured to monitor signals inputted to a point of sale system. For example, the monitoring system 155 can be configured to detect communications transmitted from a scanner system to a point of sale cash register. The monitoring system 155 can also monitor communications transmitted from a keyboard transmitted to the scanner system. An operator can use the keyboard to generate input for purchase of an item. In other embodiments as discussed below, the monitoring system 155 can detect events based on communications outputted by a point of sale system. For example, the monitoring system can be configured to monitor communication generated by a printer port to a point of sale cash register.

In another embodiment, the monitoring system can detect events based on communications output by the point of sale system to a pole display (e.g., a display located near a cash register to display a price of a properly scanned item).

More specifically, in one embodiment, the monitoring system 155 can be coupled via a link to a communication port of scanner system 36 used to scan items 307. Upon receipt of a communication signal generated by the scanner system 36 on the monitored port, the monitoring system 155 generates an event notification communication and forwards such the notification to the event information manager 184 for recording and later use by analyzer 140. As discussed below in FIGS. 2 and 15 various methods can be employed to generate a timestamp (based on clock 330-1) associated with the detected event. The generated timestamp indicates a time, relative to the clock 330-1, when the event occurred.

In one embodiment, the monitoring system 155 can be coupled to a printer port of a point of sale cash register (e.g., transaction terminal 34) used to purchase an item 307. The transaction terminal 34 can be part of a point of sale system facilitating purchase of the items. Upon receipt of an appropriate signal from the transaction terminal 34 indicating occurrence of the event, the monitoring system 155 can generate an event notification that a respective event such as scanning of an item occurred.

In accordance with yet another embodiment, the monitoring system 150 can include an audio sensor to detect an audible tone generated by scanner system 36. The audible tone can indicate that an item 307 has been properly scanned by scanner system 36. Upon detection of the audible tone, the monitoring system 155 generates an event notification and forwards the event notification to the analyzer event information manager 184.

In accordance with yet further embodiments, by way of a non-limiting example, the monitoring system 155 can be configured to monitor motion of, for example, a hand and/or item across a scan window of scanner system 36. The detected motion can correspond to passing of an item 307 over a scan window, and subsequent placing of an item 307 in an output conveyor below or shopping bag. Upon detection of such a motion by the operator, the monitoring system 155 can generate an event notification indicating occurrence of the motion. The monitoring system 155 transmits the event notification over network 190 to event information manager 184.

In one embodiment, the monitoring system 155 monitors a condition in which an item is entered into the point of sale system but in which there is no customer presenting the item for purchase or return. Accordingly, one embodiment herein includes detecting absence of a customer presenting the item for entry into the point of sale system. In such an embodiment, the specific point in video can be reviewed to identify whether a cashier is fabricating a return of an item to steal money from a cash register.

There are yet other sources that monitoring system 155 can be configured to monitor to produce event notifications.

For example, as mentioned, the laser scanner itself is the device that actually scans UPC bar codes. These devices connect to POS terminals and communicate the bar code and other important information to the POS at the time of each scan. The communication is typically done over a serial port connection, universal serial bus (USB), Ethernet, or some other connection. Furthermore, since the scanners are often manufactured by different companies than the registers, the communication protocols are often well documented to third parties, thus enabling a fast, easier, and more cost effective integration strategy. The communications generated by the scanner can signal occurrence of events.

Other electronic devices are also used to ring up items and these, too, can be used to obtain scan data and generate events. For example, hand-scanners can be used to read the bar codes off of bulky, hard to position items. These types of scanners integrate with the register as well and typically using a similar if not identical interface and communication protocol.

Keyboards associated with a transaction terminal can be monitored by the monitoring system 155. Typically, the keyboards can be used to manually key in entries such as fruit, flowers, boutique items, deli items, and other items that do not necessarily have a UPC barcode or have one that is not scannable due to it being smudged or otherwise damaged.

Other devices may also be used to tell the POS register when an item has been registered for purchase. For example, a weight scale is also often used in grocery store register setups.

Furthermore, it should be noted that an external interface is not necessary for the utilization of the scan monitoring and synchronization invention. For example, the devices described herein would operate equally as well if there were, in fact, built into the POS register itself. In this case, there would be no need for monitoring these external devices in order to transmit in a timely manner the scan information. Rather, the information would be transmitted as before, but the information to be sent could be gathered directly from the POS itself, rather than from the input peripherals attached to it. Since this effectively acts as a separate and independent channel for the flow of timely scan data, this could be useful to extend the utility of the POS's in general. For instance, the devices described below could be integrated into the POS to allow it to output timely scan information without the need to rewrite existing network protocols and without the need to substantially change the existing software running on the registers or the controllers they are currently interfaced with.

Note that, in one embodiment, network 190 can be a private, variable latency network (possibly separate or independent from network 191) such as a WiFi network or other suitable network on which to convey messages to event information manager 184 for later use by analyzer 140 to adjust timestamps associated with detected events. In other embodiments, the network 190 can be a low latency network in which communications are transmitted from the more specifically 155 to the event information manager 184 with negligible delay.

The data transmitted on network 191 may be private and/or protected data generated during sales of items in retail environment. In yet further embodiments, the event notifications can be transmitted over network 191. In such an instance, there may be no need to install network 190 in the retail environment.

For each of the different types of events as mentioned, the analyzer 140 according to embodiments herein can be configured to identify a particular time in the video when the event occurred in video produced by monitoring system 150.

More specifically, one challenge associated with correlating an event detected by event monitoring system 155 and video data 320 produced by monitoring system 150 is that these two independent sources operate off different clocks and that network 190 is a variable latency network. For example, monitoring system 150 operates off clock 330-1 and monitoring system 155 operates off clock 330-2, which operate independently of each other. These clocks can be skewed from each other and can drift over time. In other words, clock 330-1 and clock 330-2 may not be synchronized with each other. Because the clocks are not synchronized, and there may be latency associated with transmission of event notifications over network 190, it may be difficult to accurately map events associated with scanning of an item at a scanner to corresponding locations or times in the video.

In contrast to conventional techniques, embodiments herein include a monitoring system 155 configured to monitor events associated with scanning of one or more items at a scanner system 36. The analyzer 140 receives, from monitoring system 150, video frame information of items being scanned at scanner system 36. The analyzer 140 can be configured to detect, via one or more communications from monitoring system 155, an occurrence of events associated with scanning of items 307.

Assume in the following example that network 190 is a variable latency network. In such an embodiment, as discussed below, heartbeat communications between monitoring system 155 and event information manager 184 can be used to adjust for differences between clock 330-1 and clock 330-2 and indexing events to respective times in the video where the events occurred. Based on heartbeat communications, the event information manager 184 produces clock information 115.

In one embodiment, to correlate a given event to a particular time in the video when the at least one event occurred, the analyzer 140 utilizes clock information 115 to determine a precise time relative to clock 330-1 when the event occurred.

For example, the analyzer 140 can communicate with monitoring system 150 to receive and store the video and corresponding timing information for the video based on a first system clock, clock 330-1. As mentioned, the monitoring system 155 may operate off a second system clock, clock 330-2, which is independent of clock 330-1. The monitoring system 155 detects occurrence of events and time stamps the events based on clock 330-2.

To account for differences between the clocks (e.g., clock 330-1 and clock 330-2), the analyzer 140 can receive heartbeat signals such as occasional messages from monitoring system 155 to calculate a time skew between clock 330-1 and clock 330-2. Via the calculated skew, the analyzer 140 can accurately correlate a detected event as indicated by monitoring system 155 to a point in received video where the event occurred. In other words, in accordance with one embodiment, the heartbeat signals (e.g., occasional messages) received from the monitoring system 155 include timing information enabling synchronization of events as detected by the monitoring system 155 to frames of video generated by the monitoring system 150.

In addition to supporting synchronization of clocks, the heartbeat communications as discussed herein can be used to indicate presence of the monitoring system 155 in computer environment 100.

It is possible that clock 330-1 and clock 330-2 drift over a course of a day. To account for drifting and clock skews, the event information manager 184 can create and store clock information 115 such as a table or mapping indicating a skew or time difference between the first clock and the second clock based on the heartbeat signals and/or related messaging between monitoring system 155 and monitoring system 150.

Accordingly, upon receipt of the time-stamped events from the monitoring system 155, the analyzer 140 can access the clock information 115 and apply an algorithm to convert the time stamp of the detected event (as stamped by the clock 330-2) into a corresponding corrected timestamp relative to clock 330-1. The corresponding corrected time stamp can then be used to accurately identify a particular location or time in the video where the event occurred.

Figure 17:
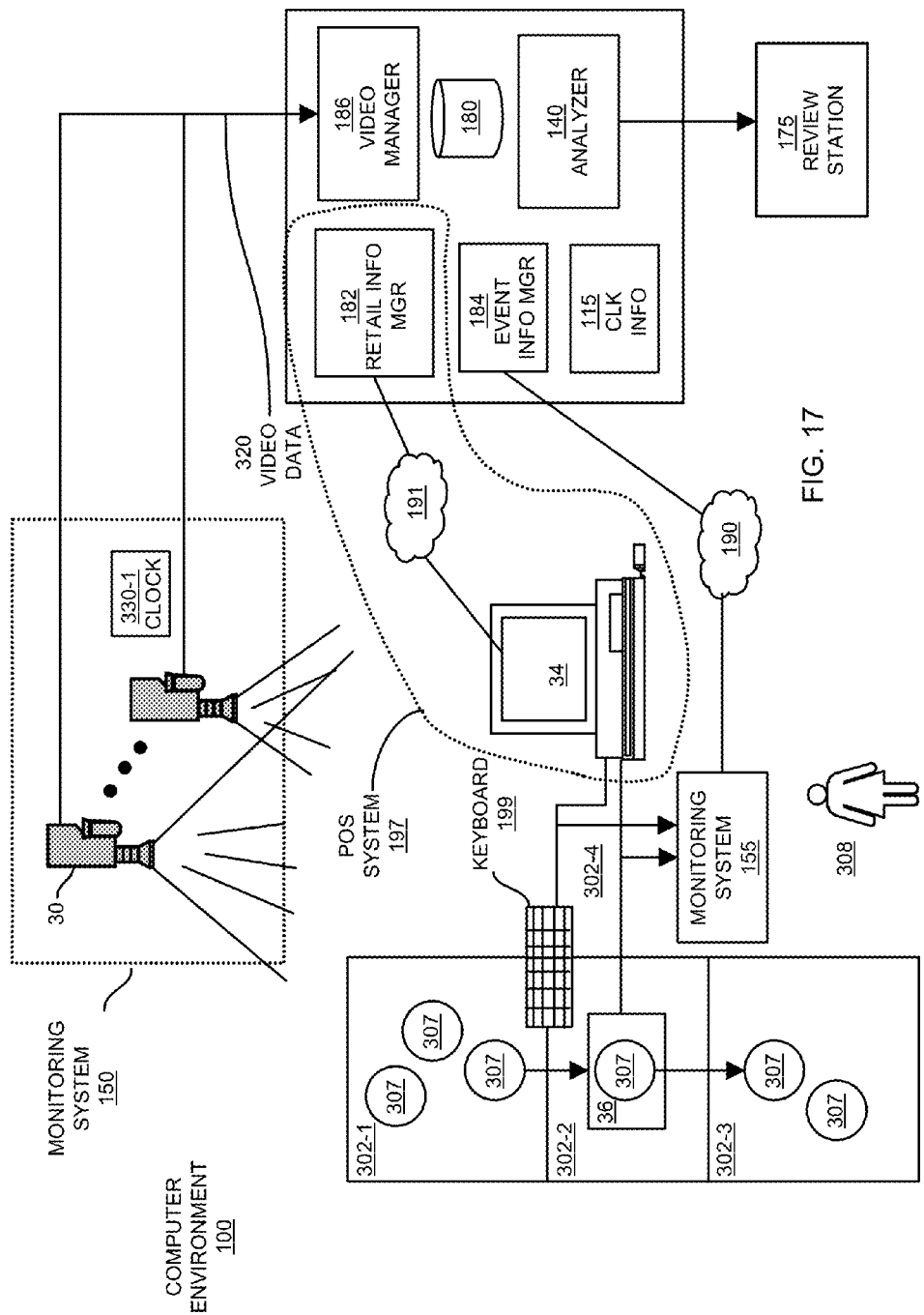
FIG. 17 is an example timing diagram illustrating monitoring of one or more devices that input information into a point of sale system according to embodiments herein.

FIG. 17 is an example diagram illustrating monitoring of one or more devices that input data to a point of sale system 197 according to embodiments herein. In such an embodiment, monitoring system 155 can monitor any of one or more sources such as a keyboard 199, scanner system 36, etc., that is used to input data into the point of sale system 197. Upon detection of an event, the monitoring system 155 generates an event notification and transits such a message over network 190 to event information manager 184. Based on the event notification and processing as discussed herein, it is possible for a reviewer to analyze video taken at a time of the event notifications.

Figure 18:
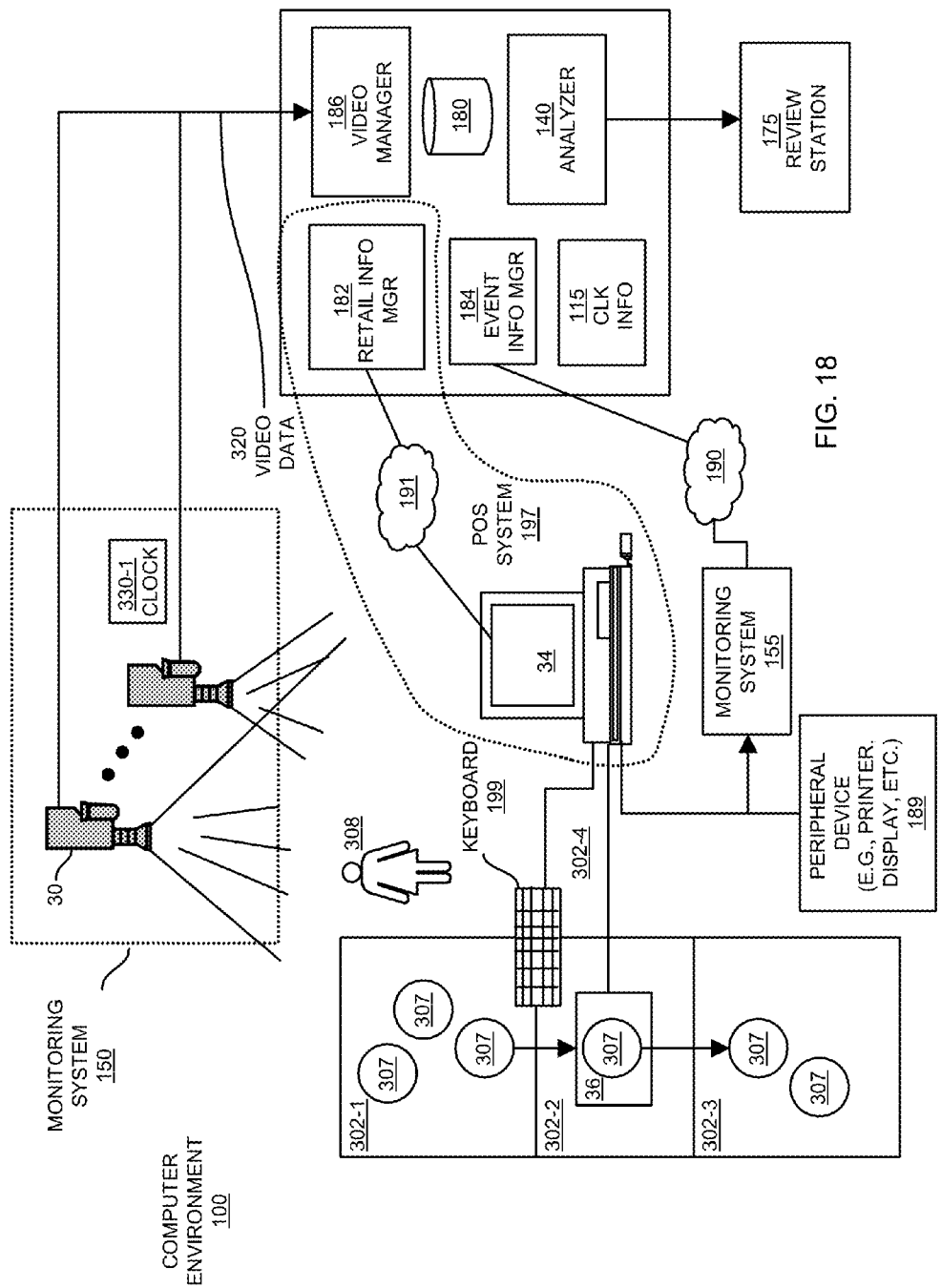
FIG. 18 is an example timing diagram illustrating monitoring of one or more output ports of a point of sale system according to embodiments herein.

FIG. 18 is an example diagram illustrating monitoring of one or more outputs of the point of sale system 197 according to embodiments herein. In such an embodiment, monitoring system 155 can monitor any of one or more outputs to peripheral point of sale devices such as printers, pole displays, etc. Upon detection of an event based on information outputted by the point of sale system 197, the monitoring system 155 generates an event notification and transits such a message over network 190 to event information manager 184. Based on the event notification and processing as discussed herein, it is possible for a reviewer to analyze video taken at a time of the event notifications.

Figure 2:
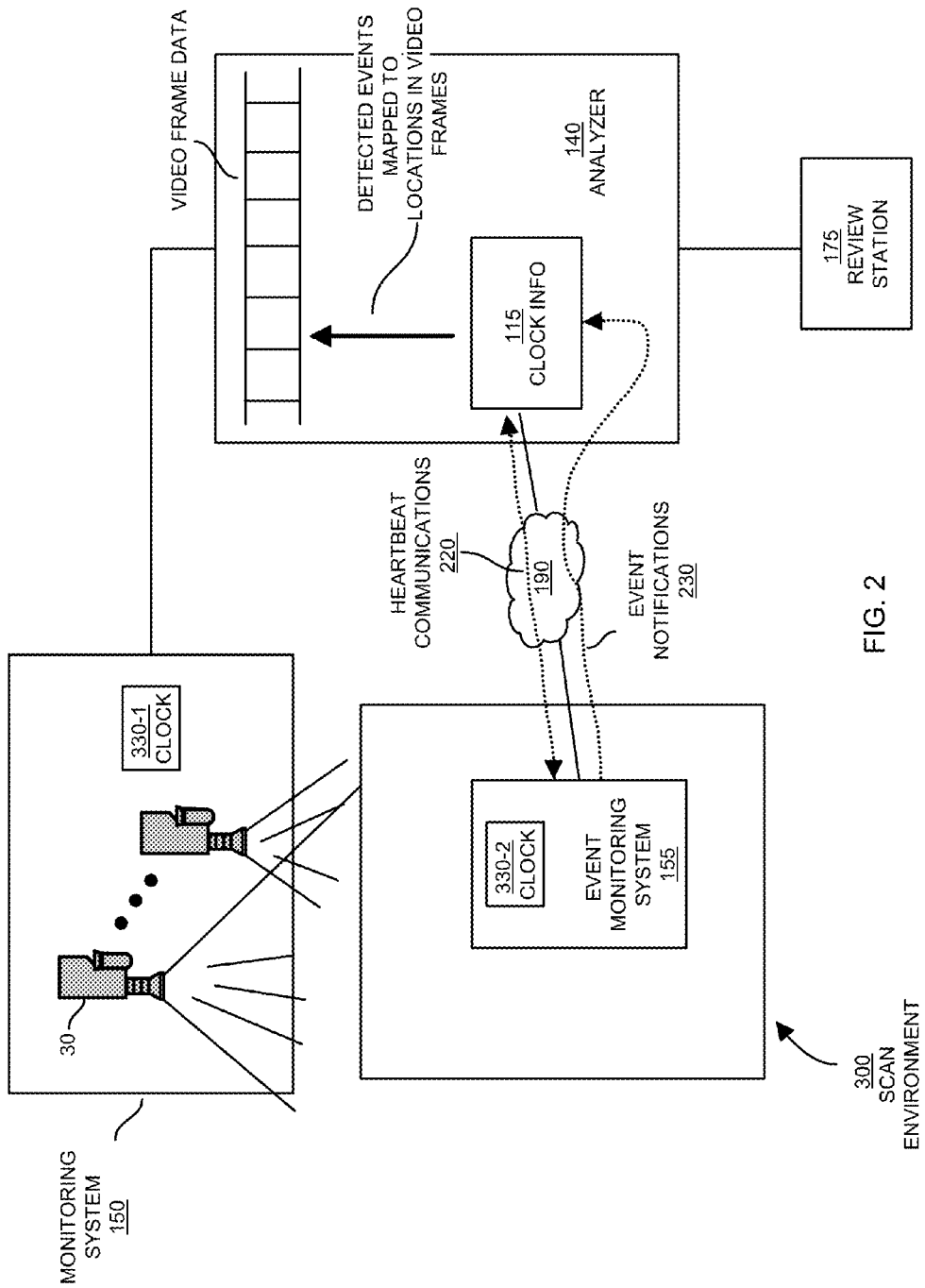
FIG. 2 is an example diagram of a video analyzer for identifying times of events in video according to embodiments herein.

FIG. 2 is an example diagram illustrating collection of clock information and use of clock adjustment information to map detected events into video frame locations where events occurred according to embodiments herein.

For example, as shown, monitoring system 150 generates video associated with scan environment 300 as previously discussed. The video is stored as frames of video data.

Monitoring system 155 generates heartbeat communications 220 over variable latency network 190 to repeatedly determine and record a time difference between clock 330-1 and clock 330-2 over time. Event information manager 184 derives and stores clock information 115 from the heartbeat communications 220 (e.g., a time difference between clock 330-1 and clock 330-2).

In addition to heartbeat communications 220, monitoring system 155 transmits event notifications to analyzer 140. As previously discussed, each event notification from monitoring system 155 can include a time stamp (relative to clock 330-2) when the respective event occurred. In other words, upon detection of a respective event, the monitoring system 155 can generate a timestamp based on clock 330-2 to indicate a time when the respective event occurred. Analyzer 140 utilizes the clock information 115 to adjust the received timestamps and correlate the events to respective times in the video where the event occurred.

Review station 175 enables display of information associated with a corresponding event and one or more frames of video where the corresponding event occurred in the recorded video.

Figure 3:
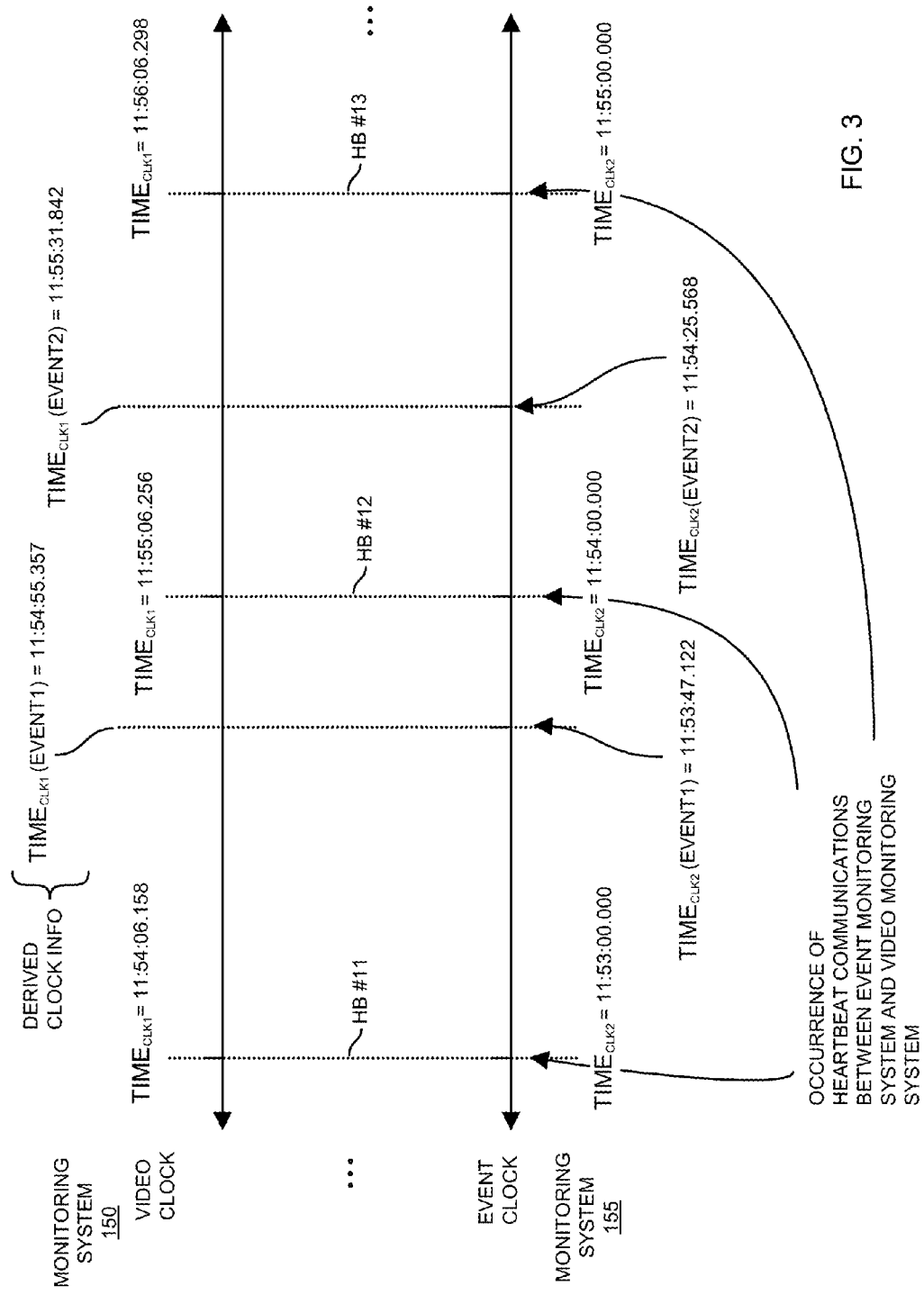
FIG. 3 is an example timing diagram illustrating timing associated with heartbeat messages and event notifications according to embodiments herein.

FIG. 3 is an example timing diagram illustrating a timing of event communications and heartbeat communications according to embodiments herein.

As shown, via a heartbeat channel, at $TIME_{CLK2}$=11:53:00.000 (a format of which is hours:minutes:seconds) relative to clock 330-2, the monitoring system 155 and event information manager 184 communicate with each other. The heartbeat communications between monitoring system 150 and event information manager 184 can be used to accurately estimate and record time differences between clock 330-1 and clock 330-2.

More specifically, according to one embodiment, a heartbeat communication from monitoring system 155 to event information manager 184 at $TIME_{CLK2}$=11:53:00.000 can include a time stamp indicating a time, relative to clock 330-2, when the heartbeat communication was sent from monitoring system 155.

At certain times, there may be relatively low latency associated with transmission of data packets or communications over variable latency network 190 to event information manager 184. When latency is low, the time associated with transmission over network 190 is typically negligible and the time difference between clock 330-1 and clock 330-2 can be estimated based on the time difference between the timestamp of the event notification (indicating a time of transmitting the heartbeat communication from the monitoring system 155 per clock 330-2) and a time (relative to clock 330-1) when the event information manager 184 receives the communication. Event information manager 184 stores a calculated time difference between clock 330-1 and clock 330-2 as clock information 115. If the latency of transmitting the notification message over network 190 is negligible, the skew between the clock 330-1 and clock 330-2 is approximately equal to a difference between the timestamp of the notification and the time stamp indicating receipt of the notification.

Latency associated with transmitting messages in network 190 can be determined based on a round trip time of sending the communication from the monitoring system 155 and receiving an acknowledgment from event information manager 184. For example, upon receipt of a heartbeat communication from monitoring system 155, the event information manager 184 can immediately send a response back to the monitoring system 155 to indicate that the heartbeat message was received by the event information manager 184. The monitoring system 155 can calculate a round trip message time based on a difference between a time of sending the initial heartbeat communication and a time (relative to clock 330-2) of receiving the acknowledgment from the event information manager 184 that the heartbeat communication was received by the event information manager 184. If the round trip time is below a threshold value, it is known that there is relatively low latency on network 190 and that the time difference between as calculated by the event information manager 184 is relatively accurate.

In one embodiment, to generate more accurate measurements of the time difference between clocks 330, a transit time (e.g., a value such as half the round trip time approximating a delay associated with transmitting the original heartbeat message to the event information manager 184) can be calculated and forwarded to the event information manager 184. The event information manager 184 can adjust the initially generated, approximate time difference based on the calculated transit time provided by the monitoring system 155 to more accurately generate a more accurate value indicative of a time difference between clock 330-1 and clock 330-2 around a time of the heartbeat communications.

Note that as an alternative to or in addition to the above technique of generating time difference information to synchronize clocks 330, any suitable synchronization protocol can be used to calculate or estimate a time difference between clock 330-1 and clock 330-2 around a time of the heartbeat communications.

Also, note that it is possible that the round trip time of messages between monitoring system 155 and event information manager 184 may be greater than a threshold value. This condition would occur during times when there is congestion in network 190 and it takes longer to transmit a packet to a respective destination. In such an instance, upon detecting congestion for an initial heartbeat communication, the monitoring system 155 can retransmit a respective heartbeat communication to the event information manager 184 to determine a time difference between clocks 330. In one embodiment, the monitoring system 155 can wait a predetermined amount of time retransmit a heartbeat communication to synchronize the clocks 330 in a manner as discussed above if a heartbeat communication fails to produce an accurate time difference between clocks 330.

As shown in FIG. 3, heartbeat communications between the monitoring system 155 and the event information manager 184 repeat over time. For example, in the example embodiment shown, heartbeat communications occur every minute or so. However, note that spacing of the heartbeat communications can vary depending on the application and need not be periodic.

Note that either of the monitoring system 155 and event information manager can initiate the heartbeat communications. For example, the event information manager 184 can initiate communications with the monitoring system 155 to calculate a time difference between clocks 330.

In this example as in FIG. 3, assume that monitoring system 155 generates a heartbeat communication #11 at time $TIME_{CLK2}$=11:53:00.000 and transmits the message with this timestamp to event information manager 184. In this example, assume that latency in network 190 is low (or negligible) and that the event information manager 184 receives the message at time $TIME_{CLK1}$=11:54:06.158. Recall that the round trip time or other suitable technique can be used to detect the low latency condition. For heartbeat #11, the time difference between clocks 330 is therefore approximately 66.158 seconds. As mentioned above, this time difference value can be further adjusted to account for the time it takes for the original heartbeat message to be time stamped at the monitoring system 155 and time stamped again upon receipt of the message at the event information manager 184.

As previously discussed, if network 190 is congested resulting in high message transmission latency, then the monitoring system 155 and event information manager 184 can repeat attempts of synchronizing the clocks 330 via generation of further heartbeat communications.

In this example, assume that monitoring system 155 generates a heartbeat communication #12 at time $TIME_{CLK2}$=11: 54:00.000 (approximately one minute after heartbeat #11) and transmits the message with this timestamp to event information manager 184. Assuming that latency in network 190 is low again based on a suitable link quality analysis, the event information manager 184 receives the message at approximately the same time the message is sent from monitoring system 155. The monitoring system 155 generates a timestamp of $TIME_{CLK1}$=11:55:06.256 as a time of receipt. The time difference between clocks 330 is therefore approximately 66.256 seconds (assuming latency is negligible). As mentioned above, this time difference value can be further adjusted to account for the time it takes for the original heartbeat message to be time stamped at the monitoring system 155 and time stamped again upon receipt of the message at the event information manager 184. As previously discussed, if network 190 is congested resulting in high message transmission latency, then the monitoring system 155 and event information manager 184 can repeat attempts of synchronizing the clock 330.

In furtherance of this example, assume that monitoring system 155 generates a heartbeat communication #13 at time $TIME_{CLK2}$=11:55:00.000 and transmits the message with this timestamp to event information manager 184. Assuming that latency in network 190 is low or negligible again, the event information manager 184 receives the message at time $TIME_{CLK1}$=11:56:06.298. The time difference between clocks 330 is therefore approximately 66.298 seconds. As mentioned above, if desired, this time difference value can be further adjusted to account for the time it takes for the original heartbeat message to be time stamped at the monitoring system 155 and time stamped again upon receipt of the message at the event information manager 184. As previously discussed, if network 190 is congested resulting in high message transmission latency, then the monitoring system 155 and event information manager 184 can repeat attempts of synchronizing the clocks 330 based on similar types heartbeat communications.

Event information manager 184 stores the clock information 115 derived from heartbeat communications for later use as discussed below in FIG. 4.

FIG. 4 is an example diagram illustrating clock information 115 derived from heartbeat communications according to embodiments herein.

As shown, clock information 115-1 includes the information derived from heartbeat communications as previously discussed with respect to FIG. 3.

Note that the event information manager 184 can store clock information 115 for each of multiple scan environments. For example, a first scan environment can be equipped with a first video monitoring system and event monitoring system to monitor a checkout of items at a first register; a second scan environment can be equipped with a second video monitoring system and event monitoring system to monitor a checkout of items at a second register; and so on.

The event information manager 184 can receive heartbeat communications as discussed above from each scanner system's event monitoring system and generate the respective clock information 115 for the scan environment. For example, event information manager 184 generates and stores clock information 115-1 for a first scan environment; event information manager 184 generates and stores clock information 115-2 in second scan environment; and so on. Accordingly, the analyzer 140 can utilize the appropriate clock information to correlate events at the different registers to different recorded video at such sites.

Referring again to FIG. 3, the analyzer 140 utilizes the clock information 115 to correlate a particular detected event to a corresponding time in video where the event occurred. As an example, assume that the monitoring system 155 detects an event such as a scanning of an item at scanner system 36. As previously discussed, monitoring system 155 generates a timestamp based on clock 330-2 indicating when the event occurred. In this example, assume that monitoring system 155 generates a timestamp of $TIME_{CLK2}$ (event1)=11:53: 47.122 for a given event. Analyzer 140 converts this timestamp for the given event into a timestamp relative to clock 330-1 via use clock information 115-1. For example, in one embodiment, analyzer 140 utilizes information derived from heartbeat communications to calculate a precise time at which the given event occurred relative to the clock 330-2 for mapping the given event to a time or location in video where the given event occurred.

In one embodiment, the analyzer 140 utilizes interpolation to calculate such a time. For example, analyzer 140 can access clock information 115-1 to detect that the event occurred around a time of heartbeat communications #11 and heartbeat communications #12. Based on the clock information 115-1 around these heartbeat communications, for event 1 occurring at $TIME_{CLK2}$ (event1)=11:53:47.122, the analyzer 140 calculates the time based on:

clock time difference=(47.122/60)×(66.256−66.158)+ 66.158=66.2349 seconds $TIME_{CLK1}$(event1)=$TIME_{CLK2}$(event1)+66.2349 seconds $TIME_{CLK1}$(event1)=11:53:47.122+66.2349 seconds=11:54:55.357

The value $TIME_{CLK1}$ (event1)=11:54:55.357 indicates a point where the event1 was captured in video relative to clock 330-1 even though the event was stamped using a timestamp generated based on clock 330-2. Based on this calculated value, the analyzer 140 can retrieve a range of video around $TIME_{CLK1}$ (event1)=11:54:55.357 for playback to a user at review station 175. In addition to video, the analyzer 140 can retrieve information (e.g., type of item, price of item, etc.) associated with the event and display such information to the user as well. Accordingly, the reviewer can analyze appropriate video and determine whether an item was properly scanned for event 1.

Analyzer 140 can access clock information 115-1 to detect that event 2 occurred around a time of heartbeat communications #12 and heartbeat communications #13. Based on the clock information 115-1, for event 2 at $TIME_{CLK2}$ (event2) =11:54:25.568, the analyzer 140 calculates the time based on:

clock time difference=(25.568/60)×(66.298−66.256)+ 66.256=66.274 seconds $TIME_{CLK1}$(event2)=$TIME_{CLK2}$(event2)+66.274 seconds $TIME_{CLK1}$(event2)=11:54:25.568+66.274 seconds=11:55:31.842

The value $TIME_{CLK1}$ (event1)=11:55:31.842 indicates a point where the event2 was captured in video. Based on this calculated value, the analyzer 140 can retrieve a range of video around this time for playback to a user at review station 175. In addition to video, the analyzer 140 can retrieve information (e.g., type of item, price of item, etc.) associated with the event and display such information to the user as well. Accordingly, the reviewer can analyze the video associated with event 2 and determine whether an item was properly scanned.

Note that interpolation is shown by way of non-limiting example only and that any suitable technique can be used to generate a relatively accurate time difference between clocks 330 at a time of the initiate timestamping by monitoring system 155.

Accordingly, in this manner, the heartbeat timing information can be used to convert received timestamps.

Note again that monitoring system 155 can detect any type of event and that discussion of identifying a location or location in video where a scan occurs is shown by way of non-limiting example only. Via the clock information 115, the analyzer 140 can convert timestamps to identify locations of any types of events in a recorded sequence of video frames.

Note that use of the heartbeat channels is shown by way of non-limiting example only and that the clock information 115 for each scan environment can be generated based on communications performed at a time of receiving the event notification from monitoring system 155. For example, each event notification can be stamped with an appropriate timestamp relative to the clock 330-2. Upon receipt of the time-stamped communication, the event information manager can provide an acknowledgment to the monitoring system 155. If there was low latency associated with transmission of the event notification over network 190, then the event information manager 184 generates the clock information 115 as discussed above for adjusting future event notifications. Thus, if high latency is detected for a subsequent event notification, the time difference value calculated for a previous event notification can be used to generate an appropriate timestamp for the event based on clock 330-1. Thus, the techniques previously discussed for generating heartbeat signals and generating clock adjustment values can be merged with the event notifications provided by monitoring system 155.

Figure 15:
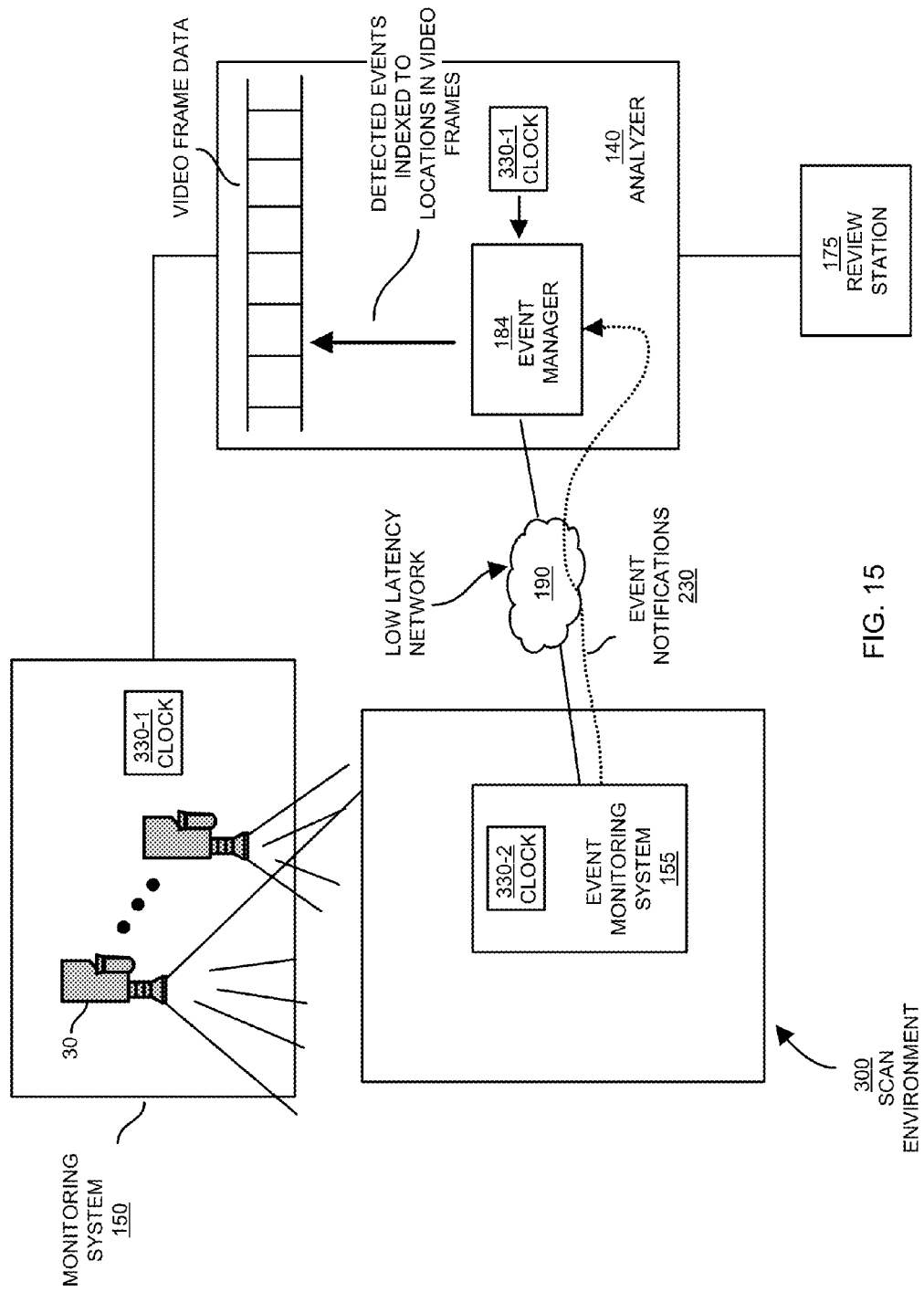
FIG. 15 is an example diagram of a video analyzer for identifying times of events in video according to embodiments herein.

FIG. 15 is an example diagram illustrating mapping of events based on transmission of events over a low latency network 190 according to embodiments herein.

Figure 16:
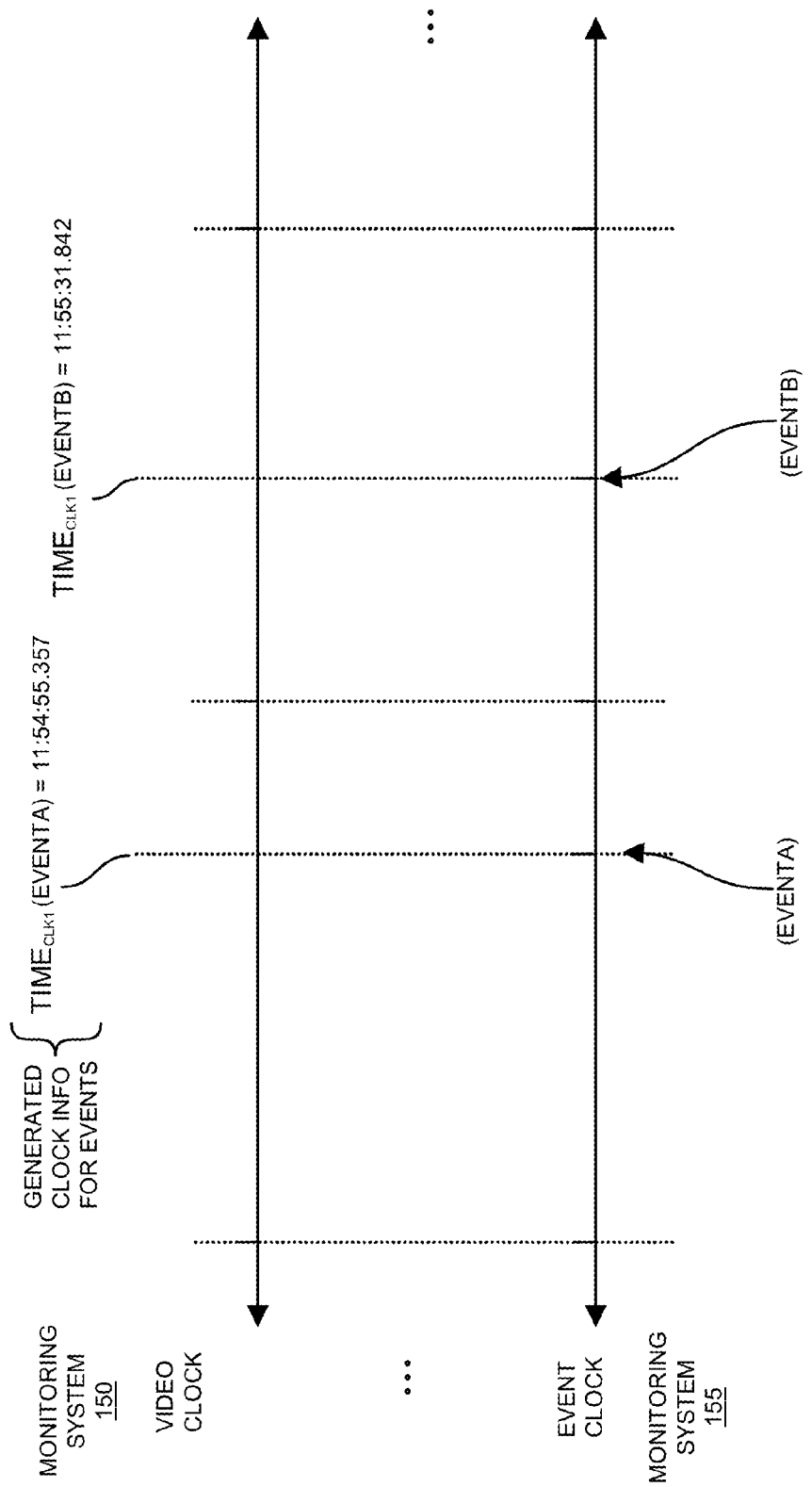
FIG. 16 is an example timing diagram illustrating indexing of detected events to video according to embodiments herein.

In this example, assume that network 190 supports transmission of communications from monitoring system 155 to event information manager 184 with a negligible time delay. In such an embodiment, the use of heartbeat signals and/or clock adjustment is not necessary to map detected events to appropriate locations in the video. Instead, upon receipt of an event notification, the event information manager 184 timestamps the received event with a value based on clock 330-1. When reviewing the event, the analyzer retrieves the timestamp associated with the event and identifies the particular frame or frames of video associated with the event as specified by the timestamp of the event. The direct mapping of an event such as event A and event B is shown in FIG. 16. Because there is no latency or a quantifiable amount of latency in network 190, the events can be directly mapped to times in the video where the events occurred.

FIG. 3 is an example timing diagram illustrating a timing of event communications and heartbeat communications according to embodiments herein.

As shown, monitoring system 155 detects event A, at which time monitoring system 155 immediately generates and forwards an event notification to event information manager 184. At a time of receipt of the notification of event A, the event information manager 184 generates a timestamp based on clock 330-1. In this example, the event information manager 184 generates timestamp at $TIME_{CLK2}=10:16:55.257$ to indicate a time when event A occurred. This timestamp for event A can be subsequently used to identify a time when the event occurred in the video.

Subsequent to detecting event A, monitoring system 155 detects event B, at which time monitoring system 155 immediately generates and forwards an event notification to event information manager 184. At a time of receipt of the notification of event B, the event information manager 184 generates a timestamp based on clock 330-1. In this example, the event information manager 184 generates timestamp at $TIME_{CLK2}=10:16:59.375$ to indicate a time when the event occurred in the video.

Note that the delay over network 190 can be calculated as a fixed value that is subtracted from the timestamp generated by event information manager 184 to adjust for any small amounts of delays in network 190. Such a technique can provide more accurate generation of timestamps for the detected events.

As previously discussed, detected events can be appropriately converted into timestamp value associated with the video clock based on use of heartbeat signals or a low latency network. In certain cases, the transaction terminal 34 communicates point of sale information associated with the events over network 191 for storage by retail information manager 182. Typically, the point of sale data transmitted over network 191 and stored by image manager 182 will be time-stamped according to a point of sale clock. The point of sale clock may be independent of both clock 330-1 and clock 330-2.

In one embodiment, note that the retail information manager 182 generates a so-called Tlog of transactions associated with a point of sale transaction terminal. The transactions and corresponding information associated with a transaction may be timestamped based on the point of sale clock. The point of sale timestamps can be converted to timestamps relative to clock 330-1 used to store the video. For example, the events detected by the monitoring system 155 can be compared with the point of sale transaction information in the Tlog. The different point of sale transactions will align with the events detected by the monitoring system 155. For example, the point of sale transactions and event notifications generated by monitoring system 155 will indicate the purchase of a sequence of items. To determine a difference between the point of sale clock and the clock 330-1, the timestamp (e.g., based on the point of sale clock) for a point of sale transaction in the Tlog is compared to the timestamp of a corresponding event detected by monitoring system 155. The difference in these timestamp values indicates an approximate offset value. This calculated offset value may be used to convert timestamps associated with other point of sale clock transactions into a timestamps of the video clock 330-1. Accordingly, it is possible to map events associated with the point of sale transactions of the appropriate locations and/or times in video where the events occur via the time corrected Tlog transactions.

Figure 5:
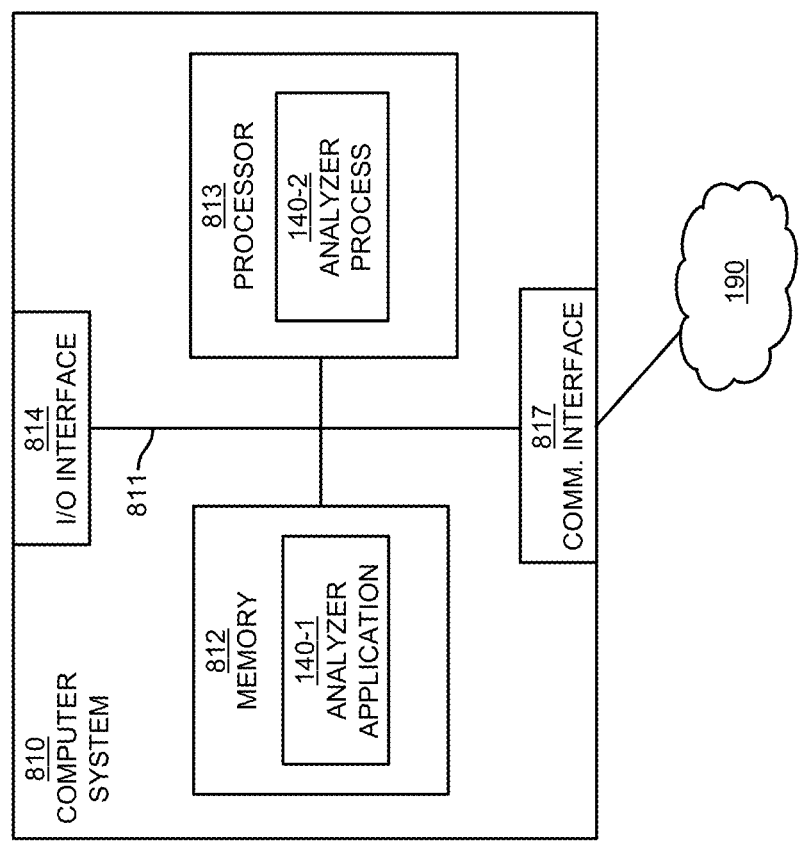
FIG. 5 is a diagram illustrating an example computer architecture for carrying out functionality according to embodiments herein.

FIG. 5 is a block diagram of an example architecture of a computer system for implementing any of the functions according to embodiments herein. In other words, the computer system 810 is an example architecture for executing functionality such as analyzer 140, monitoring system 155, monitoring system 150, event information manager 184, etc.

Computer system 810 can be a computerized device such as a personal computer, workstation, portable computing device, console, network terminal, processing device, network device, etc.

Note that the following discussion provides a basic embodiment indicating how to carry out functionality associated with the analyzer 140, monitoring system 155, etc. However, it should be noted that the actual configuration for carrying out the operations as described herein can vary depending on a respective application.

As shown, computer system 810 of the present example includes an interconnect 811 that couples a memory system 812, a processor 813 (i.e., one or more processors), I/O interface 814, and a communications interface 817.

I/O interface 814 provides connectivity to peripheral devices 816, if such devices are present, such as a keyboard, mouse, display screen, etc.

A user can provide input to computer system 810. Communications interface 817 enables computer system 810 and, more particularly, collection manager 140 to send and receive communications from remote destinations over network 190. I/O interface 814 enables the computer system 810 to retrieve locally stored information or receive input/output from one or more sources.

As shown, memory system 812 can be encoded with analyzer application 140-1 that supports functions as discussed above and as discussed further below. The analyzer application 140-1 can be embodied as software code such as data and/or logic instructions. Execution of the software code supports processing functionality according to different embodiments described herein.

During operation of one embodiment, processor 813 accesses memory system 812 via the use of interconnect 811 in order to launch, run, execute, interpret or otherwise perform the logic instructions of the collection manager application 140-1. Execution of the analyzer application 140-1 produces processing functionality in analyzer process 140-2. In other words, the analyzer process 140-2 represents one or more portions of the analyzer application 140-1 performing within or upon the processor 813 in the computer system 810.

It should be noted that, in addition to the analyzer process 140-2 that carries out method operations as discussed herein, other embodiments herein include the analyzer application 140-1 itself such as the un-executed or non-performing logic instructions and/or data. As mentioned, the collection manager application 140-1 may be stored on a computer storage medium (e.g., a repository) such as a floppy disk, hard disk or in an optical medium. According to other embodiments, the collection manager application 140-1 can also be stored in a memory type system such as in firmware, read only memory (ROM), or, as in this example, as executable code within the memory system 812 (e.g., within Random Access Memory or RAM).

In addition to these embodiments, it should also be noted that other embodiments herein include the execution of the functionality as described herein via processor 813. Thus, those skilled in the art will understand that the computer system 810 can include other processes and/or software and hardware components, such as an operating system that controls allocation and use of hardware resources.

Functionality supported by a resource such as event monitoring system 155, event information manager 184, analyzer 140, etc., according to embodiments herein will now be discussed via flowcharts in FIGS. 6-9. Note that there will be some overlap with respect to concepts discussed above for FIGS. 1 through 5. Also, note that the steps in the below flowcharts need not always be executed in the order shown.

Figure 6:
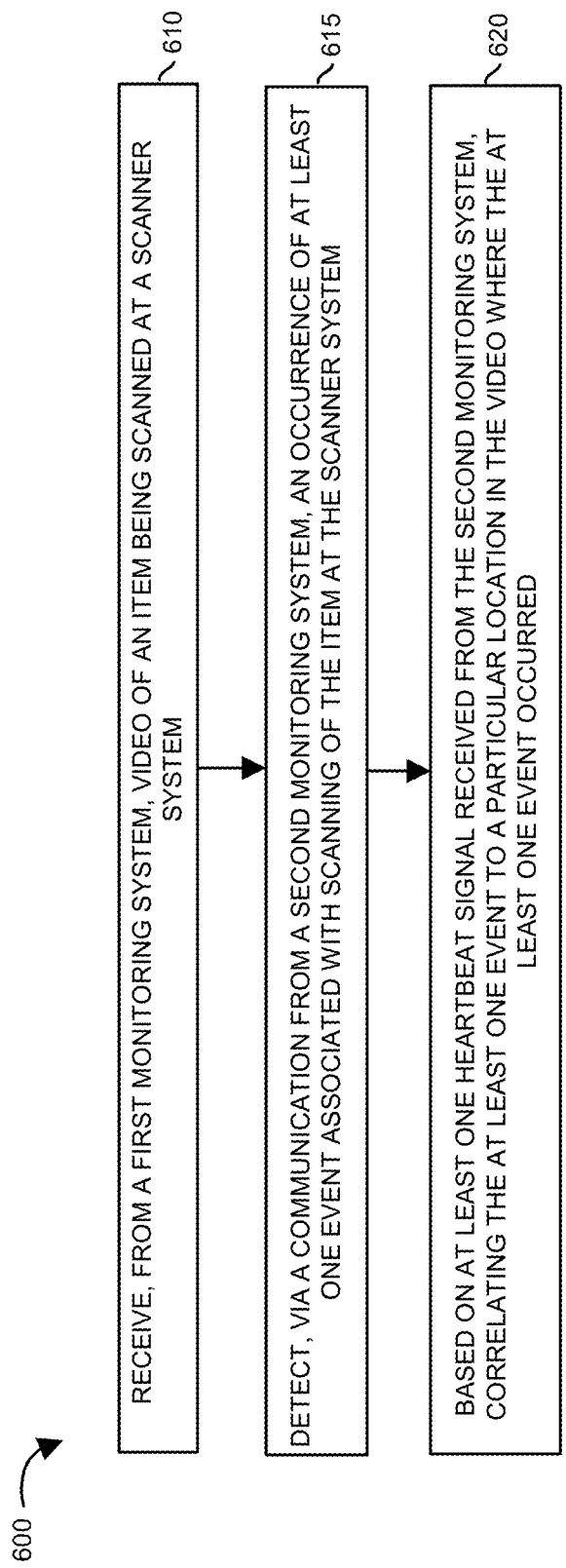
FIGS. 6-9 are an example diagrams of flowcharts for correcting differences associated with clocks according to embodiments herein.

FIG. 6 is a flowchart 600 illustrating an example method according to embodiments herein.

In step 610, the analyzer 140 receives, from monitoring system 150, video of an item being entered into point of sale system. This can include scanning of an item via scanner 36.

In step 615, the analyzer 140 detects, via a communication from monitoring system 155, an occurrence of at least one event associated with entering of the item into the point of sale system.

In step 620, the analyzer 140 correlates the at least one event to a particular time in the video when the at least one event occurred. As discussed herein, in certain cases, correlating of the events can be based at least in part on heartbeat communications such as one or more heartbeat signal (e.g., communications) received from monitoring system 155.

Figure 7:
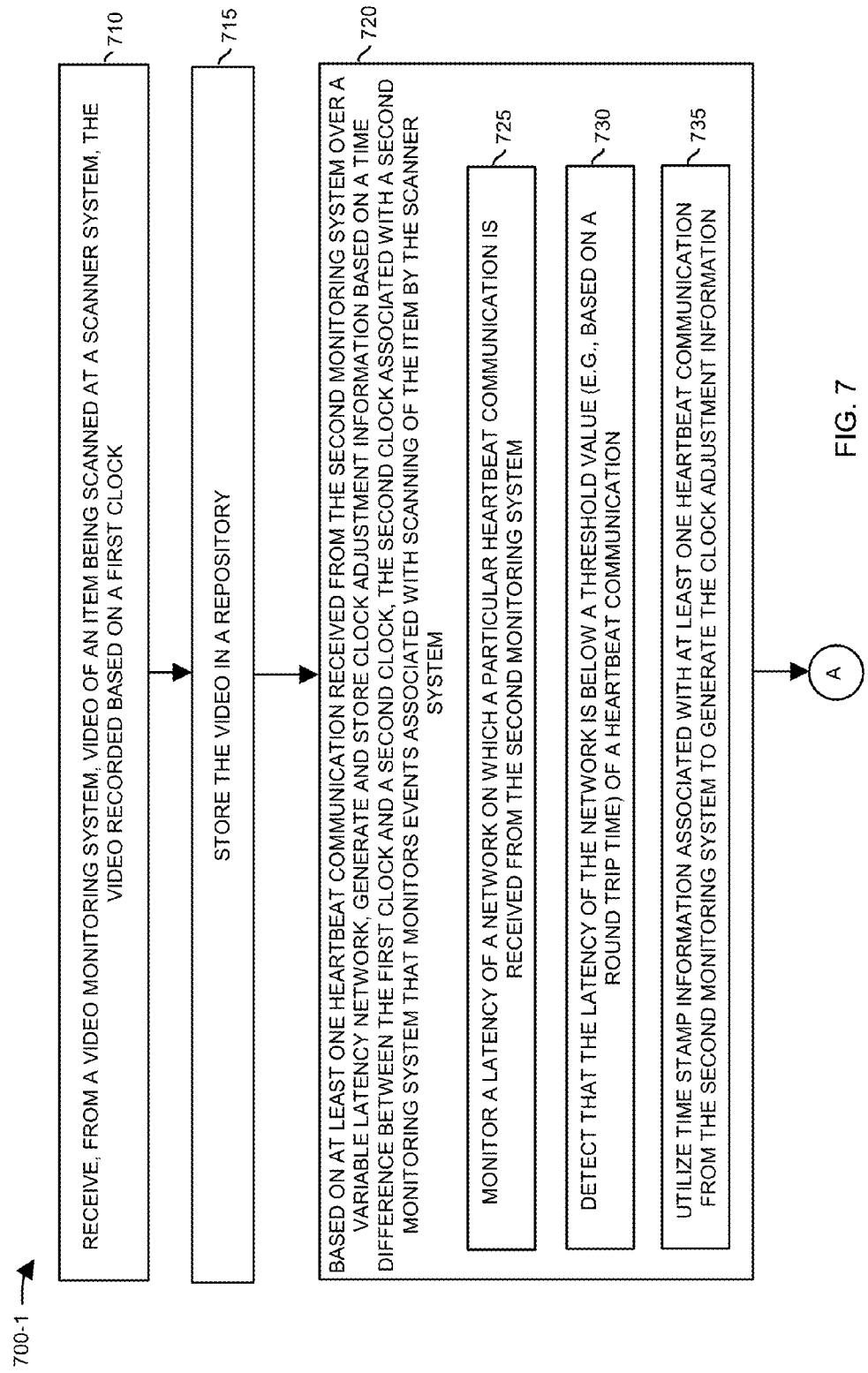
Figure 8:
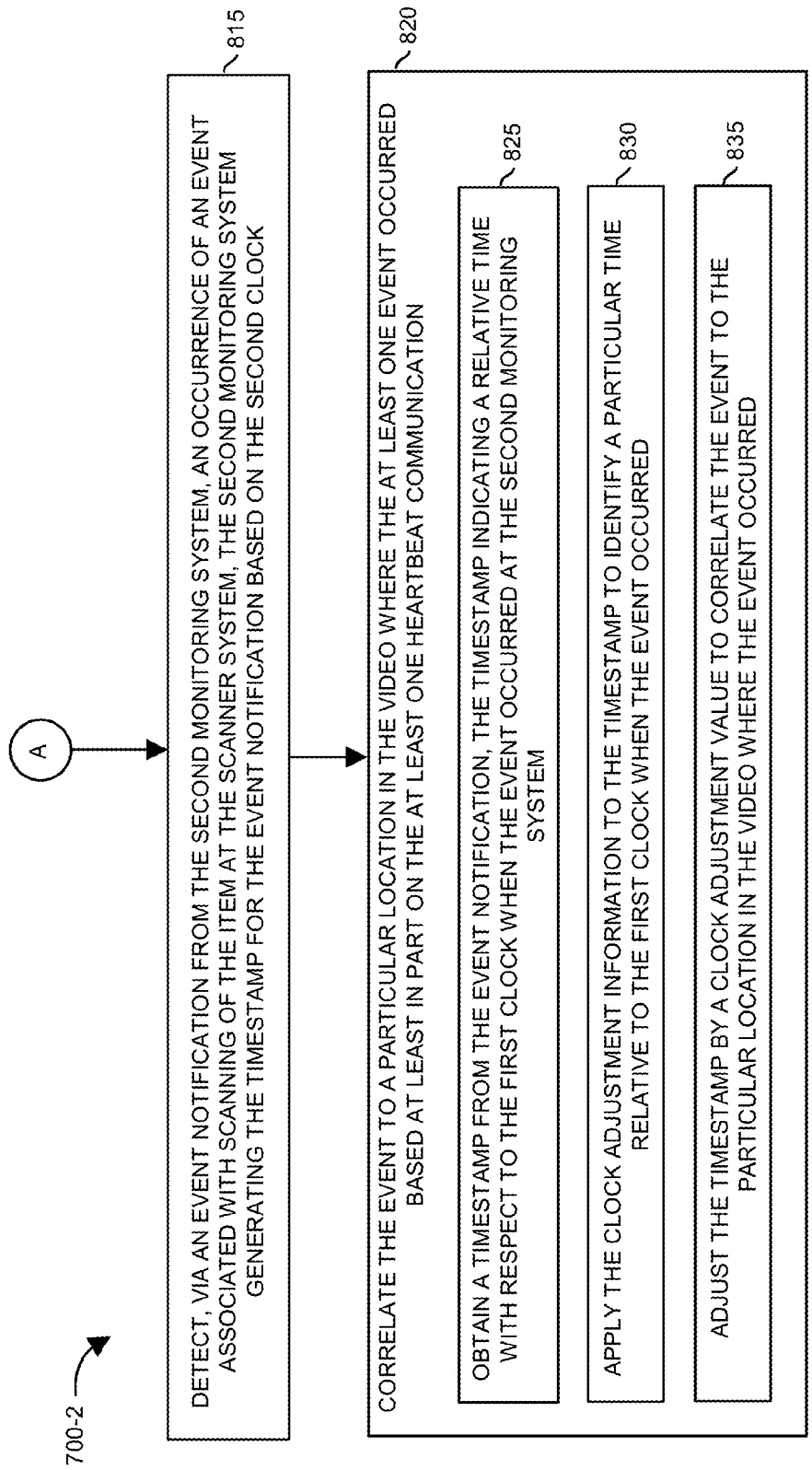

FIGS. 7 and 8 combine to form an example flowchart 700 (e.g., flowchart 700-1 and flowchart 700-2) of a method according to embodiments herein.

In step 710, the video manager 186 receives, from a video monitoring system 150, video of an item 307 being scanned at a scanner system 36. The video is recorded based on clock 330-1.

In step 715, the video manager 186 stores the video in repository 180.

In step 720, based on at least one heartbeat communication received from the monitoring system 155 over variable latency network 190, the event information manager 184 generates and stores clock information 115 based on a time difference between clock 330-1 and clock 330-2. As mentioned, the clock 330-2 is associated with monitoring system 150 that monitors events associated with scanning of the item 307 by the scanner system 36.

In step 725, the monitoring system 155 and/or event information manager 184 monitors a latency of a network 190 on which a particular heartbeat communication is received from monitoring system 155.

In step 730, the monitoring system 155 and/or the event information manager 184 detects that the latency of the network 190 is below a threshold value (e.g., based on a round trip time of a heartbeat communication).

In step 735, the event information manager 184 utilizes time stamp information associated with one or more heartbeat communications from the monitoring system 155 to generate the clock information 115.

In step 815 of flowchart 700-2, the event information manager 184 detects, via an event notification from monitoring system 155, an occurrence of an event associated with scanning of the item at the scanner system 36. In one embodiment, the monitoring system 155 generates the timestamp for the event notification based on the clock 330-2.

In step 820, the analyzer 140 correlates the event to a particular location or time in the video where the event occurred based at least in part on the timing information 115 collected by event information manager 184 based on the heartbeat communications.

In step 825, the analyzer 140 obtains a timestamp from a received event notification. As previously discussed, the timestamp indicates a relative time with respect to the clock 330-2 when the event occurred at the monitoring system 155.

In step 830, the analyzer 140 applies the clock information 115 to the timestamp associated with the event notification to identify a particular time relative to the clock 330-1 when the event occurred.

In step 835, the analyzer 140 adjusts the timestamp in the notification by a clock adjustment value (as derived from the clock information 115) to correlate the event to the particular location or time in the video where video of the event was recorded.

Figure 9:
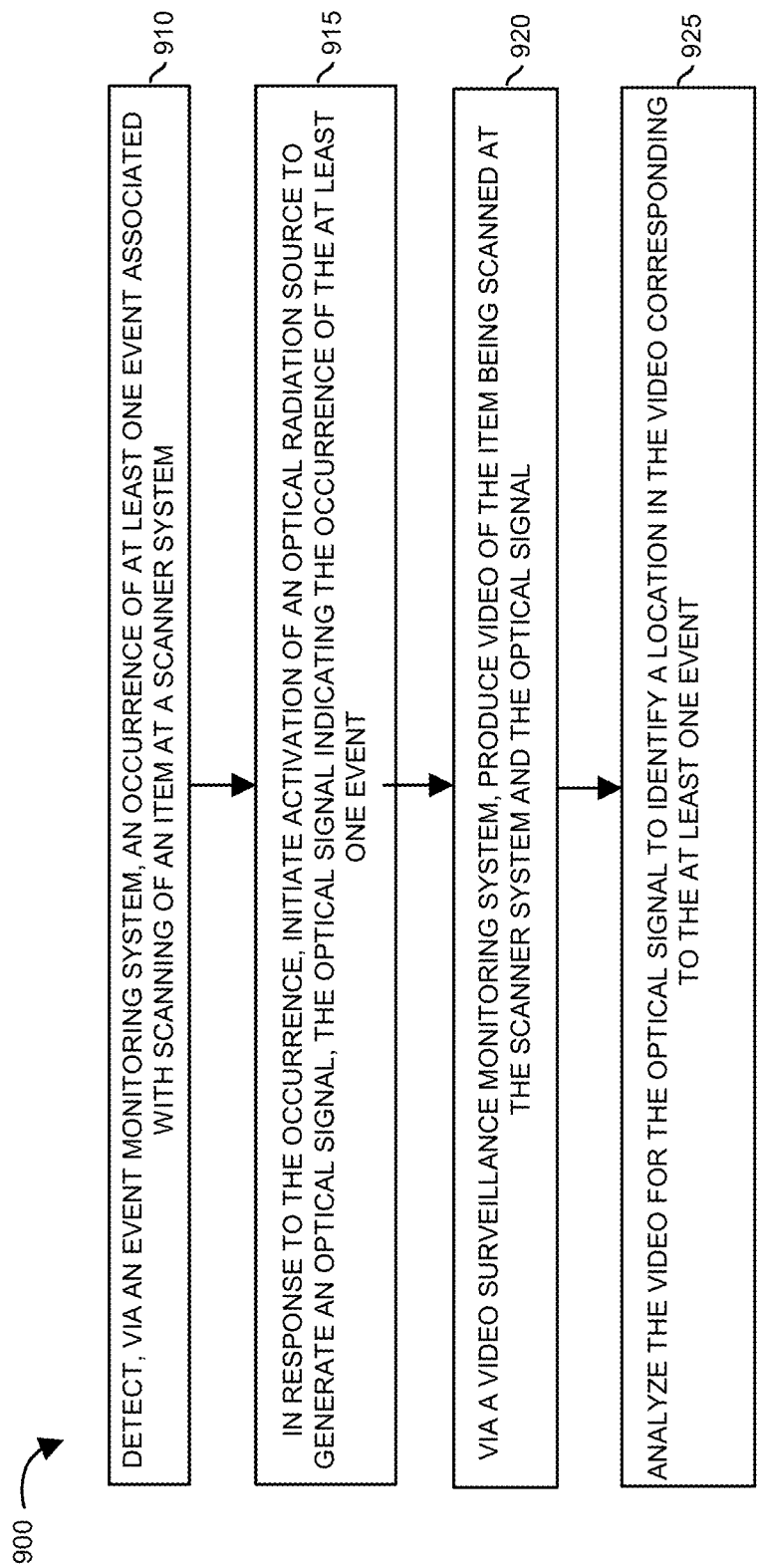

FIG. 9 is an example flowchart 900 of a method according to embodiments herein.

Note that the monitoring system 155 in FIG. 1 can be configured to include an optical radiation source that emits an optical signal when a respective event is detected. In such an embodiment, the monitoring system 150 records the optical signal in the video when an event occurs. Because the optical signal generated by the monitoring system 155 occurs at approximately the same time as the event, the optical signal indicates on the recorded video when the event occurs.

In step 910, the monitoring system 155 detects an occurrence of at least one event associated with scanning of an item at a scanner system 36. The monitoring system 155 can monitor any of a number of sources to detect occurrence of events.

In step 915, in response to the occurrence, the monitoring system 155 initiates activation of an optical radiation source to generate an optical signal. The optical signal indicates the occurrence of the at least one event. In one embodiment, the optical radiation signal is in the infrared that is not detectable by the human eye, but that is detectable by a camera. Activation of the optical radiation source can include modulating or pulsing the optical signal ON and OFF to convey bit information specifying a type of event that was detected by the monitoring system 155. A sequence of one or more ON/OFF pulses can indicate a type associated with the detected event. For example, a first unique sequence of ON/OFF pulses produced by the optical radiation source can indicate a first type of event; a second unique sequence of ON/OFF pulses produced by the optical radiation source can indicate a second type of event, and so on.

In step 920, a video surveillance monitoring system such as monitoring system 150 produces video of an item being scanned at the scanner system 36. The video captures the optical signal generated by the monitoring system 155 as well as any objects or persons such as a cashier, register, item being scanned, etc.

In step 925, the analyzer 140 analyzes the video for presence of the optical signal to identify a location or time in the video corresponding to the at least one event. In one embodiment, the analyzer 140 demodulates the optical signal captured on video to determine a type of event detected. Mere presence of the optical signal can indicate that the event occurred. As mentioned, in one embodiment, the type associated with a detected event can be one of multiple different types. For example, the analyzer 140 can analyze the video and decode pulsing of the optical signal in the video to produce bit information such as a first unique sequence, second unique sequence, etc., indicating a particular type associated with the at least one event. In accordance with the embodiments as discussed above, the monitoring system 155 can modulate an optical radiation source to indicate different events.

For example, the monitoring system 155 can detect transmission of a message from the scanner system to a point of sale system. Based on detection of the message, the monitoring system 155 modulates the optical signal accordingly.

In accordance with another embodiment, the monitoring system 155 can detect output of a message from a point of sale system to which a scanner system is communicatively connected. The message generated by point of sale system can be generated based on scanning of the item at the scanner system. Based on detection of the message, the monitoring system 155 modulates the optical signal accordingly.

In accordance with another embodiment, the monitoring system 155 can detect an audible tone produced by the scanner system. The audible tone can indicate that the item was recognized by the scanner system during the scanning. Based on detection of the audible tone, the monitoring system 155 modulates the optical signal accordingly.

In accordance with another embodiment, the monitoring system 155 can detect conveyance of the item passed a scan window of the scanner system. Passing of the item by the scan window may not result in a valid scan of the item. In such an instance, the monitoring system 155 modulates the optical signal accordingly to indicate the passing of the item by the scan window.

Figure 19:
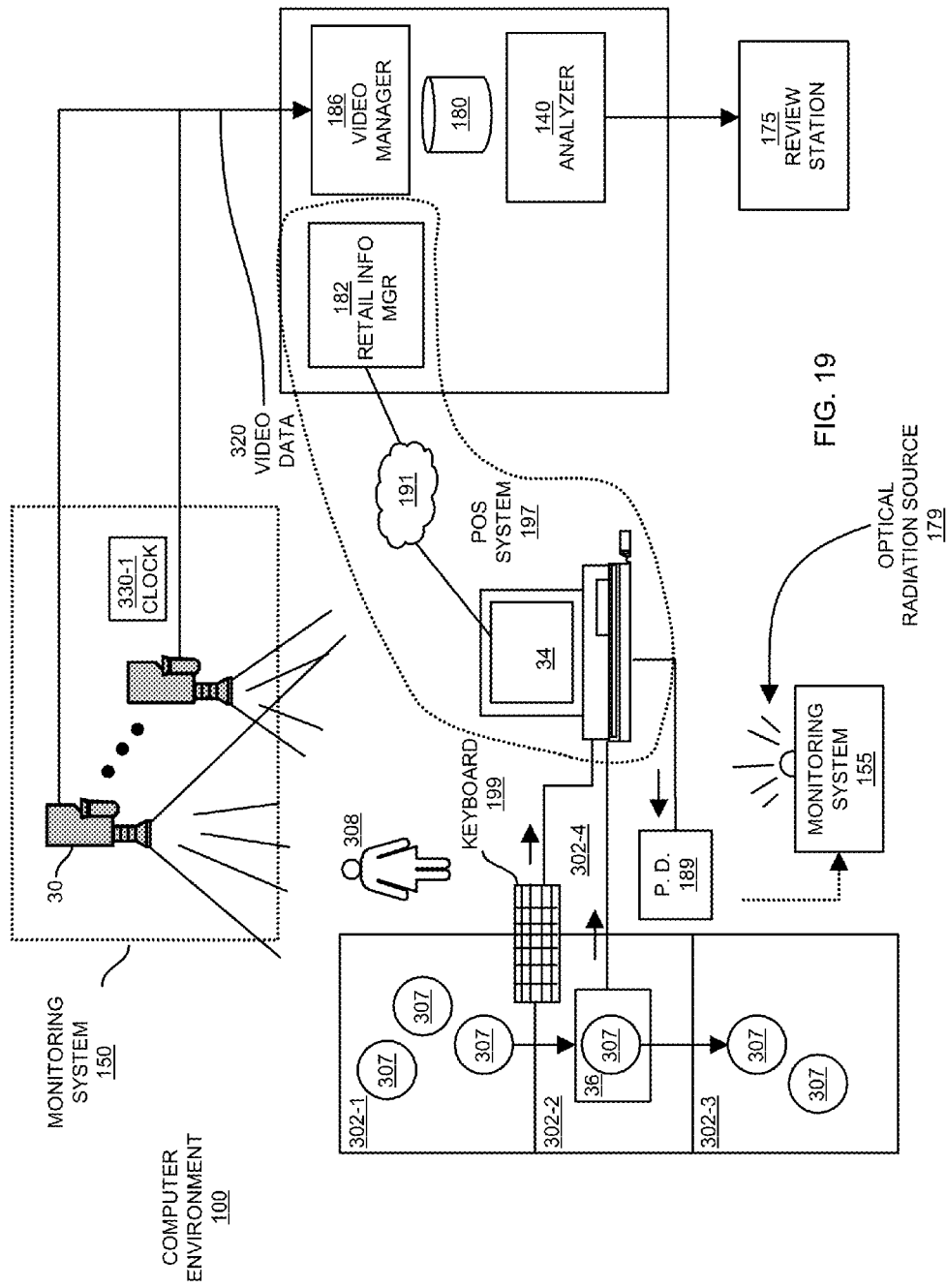
FIG. 19 is an example timing diagram illustrating an optical radiation source activated based on detection of different events according to embodiments herein.

FIG. 19 is an example diagram illustrating use of an optical radiation source 179 to provide notification of an event according to embodiments herein. As shown and previously discussed monitoring system 155 can monitor any of one or more sources such as sources that input data into the point of sale system 197 or output data form the point of sale system 197. Upon detection of an event, the monitoring system 155 generates an optical signal captured by monitoring system 150. Based on analysis of the video and detection of the optical signal produced by optical radiation source 179, the analyzer 140 can identify a time when different events occurred in the video.

Overview of Yet Further Embodiments

Figure 10:
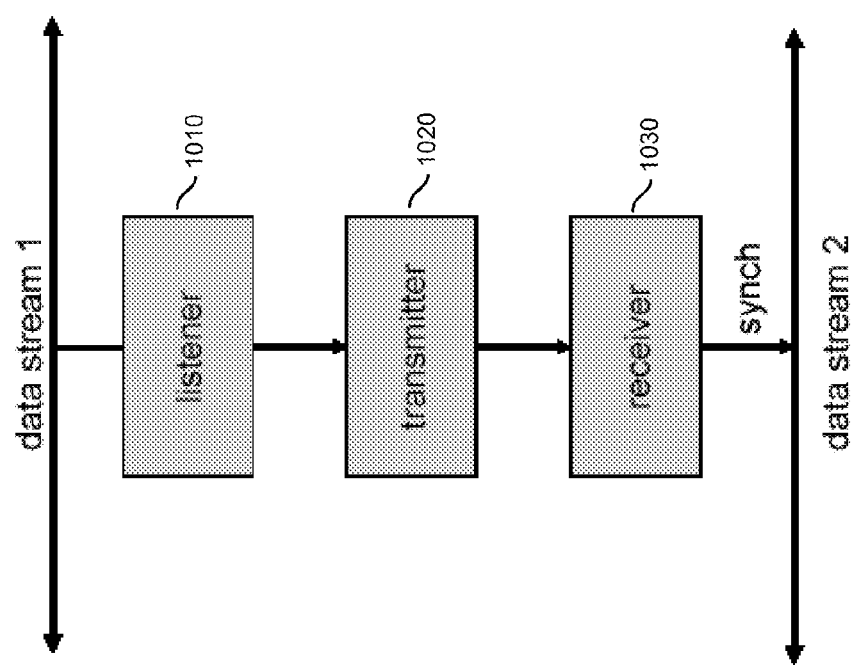
FIG. 10 is an example timing diagram illustrating a monitoring system according to embodiments herein.

This application describes configurations for integrating with UPC scanners and other such devices in order to obtain real time scan information that can be readily synchronized with video data obtained elsewhere and from a separate network. The devices consist of three parts: the listener 1010, the transmitter 1020, and the receiver 1030. FIG. 10 shows how the three parts interact to form the complete system.

FIG. 10 is an example diagram illustrating monitoring system according to embodiments herein. The listener 1010 is responsible for monitoring traffic sent and/or received by the UPC scanners and other such devices in order to detect and potentially interpret any signals, which may be sent in a timely manner associated with an item scan. The information that can be monitored varies and can include: audible signals sent by the scanner, traffic between scanner and register, and any other signals output by the scanner or input to the register.

The transmitter 1020 is responsible for transmitting that signal or some representation of that signal in a timely fashion, over some medium, to be collected at some intermediate or central location.

The receiver 1030 is responsible for detecting, collecting, and interpreting signals sent from the transmitter 1020 in order for those signals to be used to synchronize scan events with surveillance video of an item being scanned at checkout.

A first device listens for port traffic over the communication link between scanner and POS. In one embodiment, the device transmits that data by creating an infrared or visual signal which is then recorded by the security camera. The receiver 1030 is a device which automatically reviews the security video in order to detect and extract the signals transmitted by the transmitter 1020.

A second device also listens for port traffic over the communication link between scanner and POS, and transmits that data by a radio frequency (RF) link for receipt by a device connected to the other end of the RF link.

Optical Scan Sensor

Figure 11:
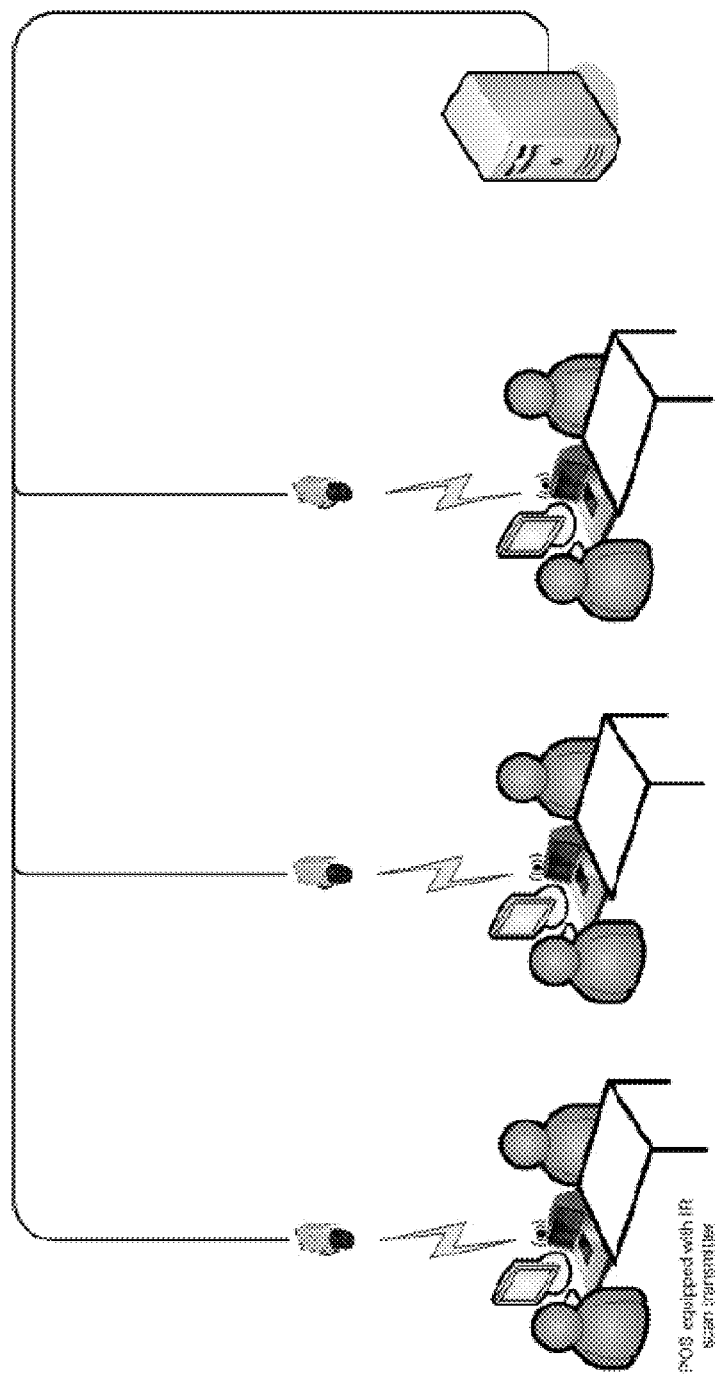
FIG. 11 is an example diagram illustrating a monitoring system according to embodiments herein.

FIG. 11 is an example diagram illustrating an optical scan sensor system according to embodiments herein.

An optical scan sensor is attached to each scanner system for each register under surveillance. When an item is scanned, the sensor flashes in a coded sequence in a manner as previously discussed. The sensor operates using infrared (IR) light, which is detected and recorded in the surveillance video.

Figure 12:
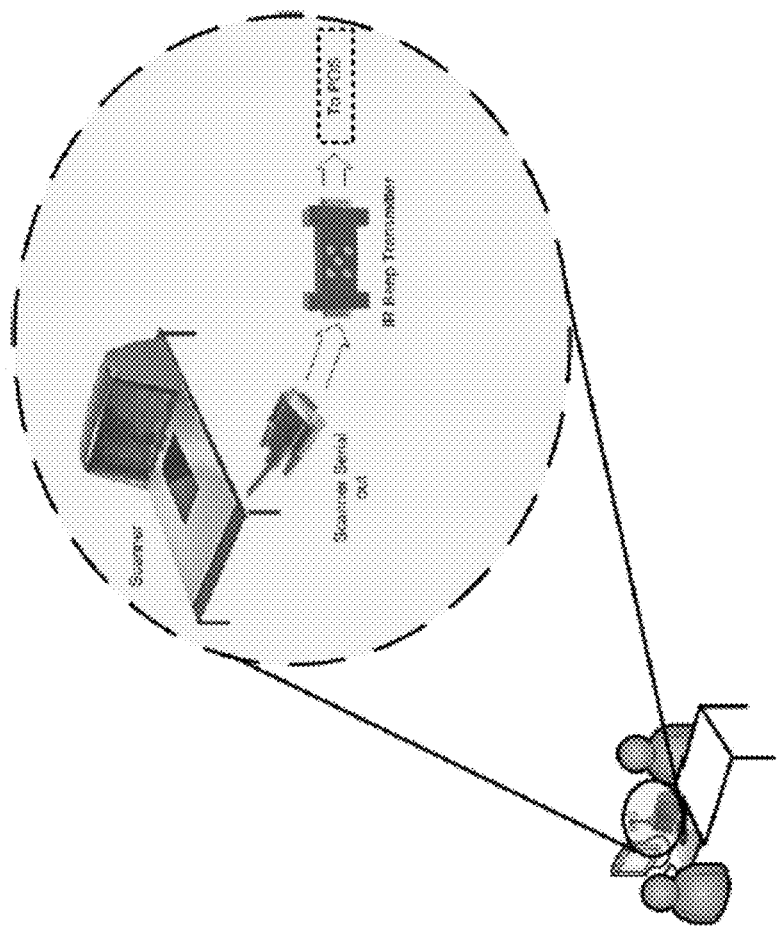
FIG. 12 is an example diagram illustrating a monitoring system according to embodiments herein.

FIG. 12 is an example diagram illustrating a detailed view of an optical scan sensor according to embodiments herein. In one embodiment, the scan sensor attaches to the output connector of each UPC scanner system in order to monitor the traffic for the detection of scan event. When a scan event is detected, an IR transmitter flashes in a coded sequence. The surveillance video records the flashes. An analyzer can find video of interest based on presence of the optical signal generated by the IR transmitter.

More specifically, the monitoring system 155 as discussed herein can be configured to detect an occurrence of an event associated with scanning of an item at a scanner system as discussed above. In response to the detecting the event, the monitoring system 155 initiates activation of an optical radiation source to generate an optical signal. The generated optical signal indicates the occurrence of the event. A monitoring system 150 such as a video surveillance monitoring system produces video of the item being scanned at the scanner system. The monitoring system 150 detects the optical signal and records it on the respective video. Subsequent to storage of the video, an analyzer can be configured to analyze the video for presence of the optical signal to identify the times in the video where events occurred.

In one embodiment, the optical radiation signal produce by the monitoring system 155 resides in the infrared wavelength.

Again, FIG. 11 shows the reference implementation of the optical scan sensor. We refer to it as an "optical" sensor without loss of generality. This approach works for light in the visible spectrum, as well as other regions, such as infrared. This approach extends easily to other mediums as well, such as IR sensors, thermal imaging cameras, and ultrasound sensors. The reference implementation uses IR light, which is easily detectable and recordable by typical surveillance cameras, so as to be discrete and unobtrusive when operating in a retail environment and to best leverage a store's existing camera infrastructure.

In one embodiment, the listener 1010 is a small device that attaches to the scanner system via a Y-connector or any other type of connection that allows a signal to be observed without impeding the original flow of that signal. In this case: we can listen or to or snoop the traffic to and from the scanner system without affecting its communication with a respective cash register. In another embodiment, the listener 1010 can be a small microphone that listens for the auditory beep produced by the scanner system upon the successful scanning of an item.

The listener 1010 interprets the data output by the scanner system (or input to it) and, upon finding a signal indicative of a scan, sends an event to the transmitter 1020 with the relevant data.

Upon receiving an event from the listener 1010, the transmitter 1020 summarizes the event and transmits it via an optical signal. In the reference implementation, the signal transmitted is a simple flash indicating that an event occurred. As in the case just described, the signal transmitted might be one bit, where each flash indicates one bit of information. The signal for one bit could also be modulated more robustly, however, to account for high levels of noise in the transmission medium and loss at the receiver 1030 1030. In order to indicate more than simply the time at which a scan event occurred, we may also wish to send more than one bit. For example, we may wish to send the SKU or any other data that can be extracted from the listener 1010 and which is relevant to the scan. Any such information is easily modulated and sent by the transmitter 1020. Alternatively, multiple lights communicating multiple bits of information might also be used to send richer multi-bit information.

It is the receiver 1030's job to detect the presence of the flashes in the security video, demodulate them, and decode them back into the original transmitted message. In the reference implementation, for example, the receiver 1030 looks for differences in brightness at a particular time or location in the security video in order to detect the presence of the flash sent by the transmitter 1020. Any suitable algorithm can be used to detect the flashes in video. Other such approaches include correlation-based approaches to measure discontinuities in self-similarity, or convolution-based approaches to demodulate a noise-robust modulation approach employed by the transmitter 1020. Upon the detection of such a flash in respective video, a bookmark is placed in the video stream to indicate the presence within the video of the time at which a scan occurs. In this way, video and scan data of an item can be synchronized with each other.

Wireless Scan Sensor

Figure 13:
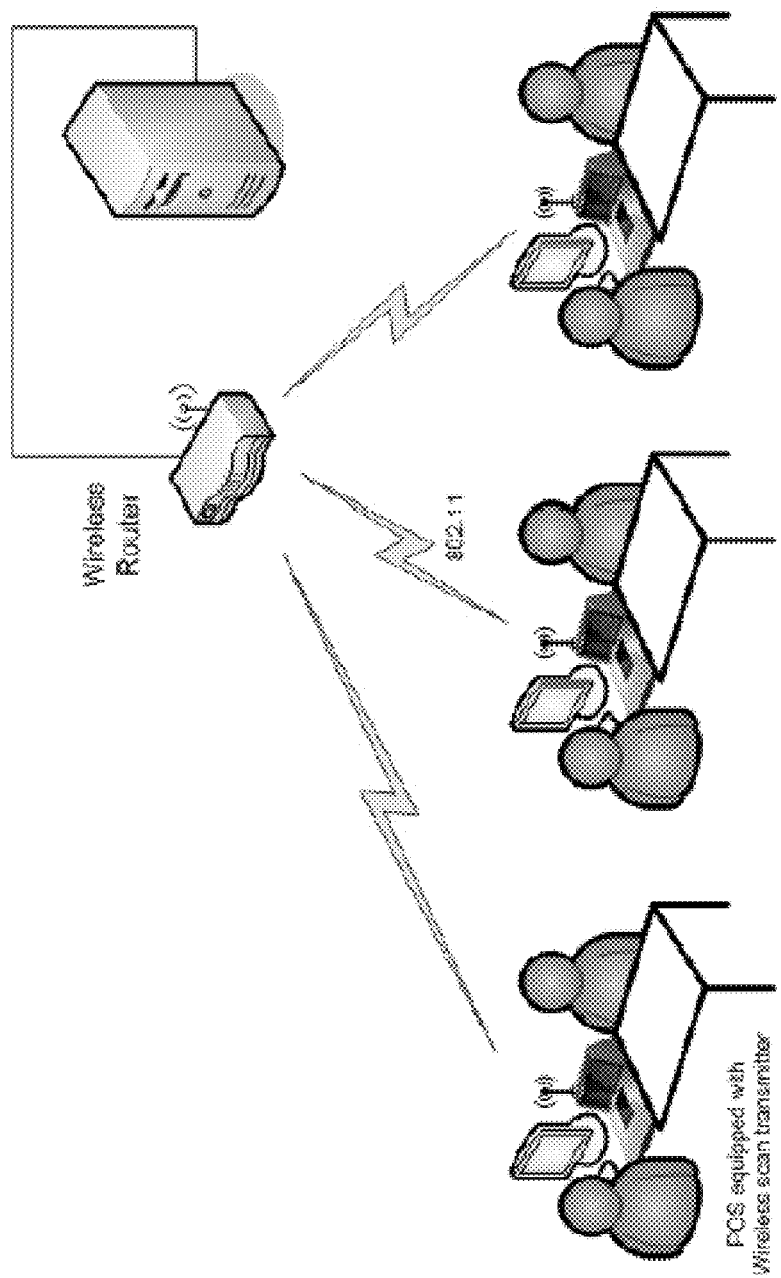
FIG. 13 is an example diagram illustrating implementation of a monitoring system according to embodiments herein.

FIG. 13 is an example diagram illustrating implementation of a wireless scan sensor according to embodiments herein. As shown, a wireless scan sensor can be attached to each scanner system for each register under surveillance and is also connected to a larger wireless network, such as one based on the 802.11 standard. When an item is scanned, the wireless scan sensor sends relevant data across the wireless network to a receiver 1030, which collects this data in a timely manner.

Figure 14:
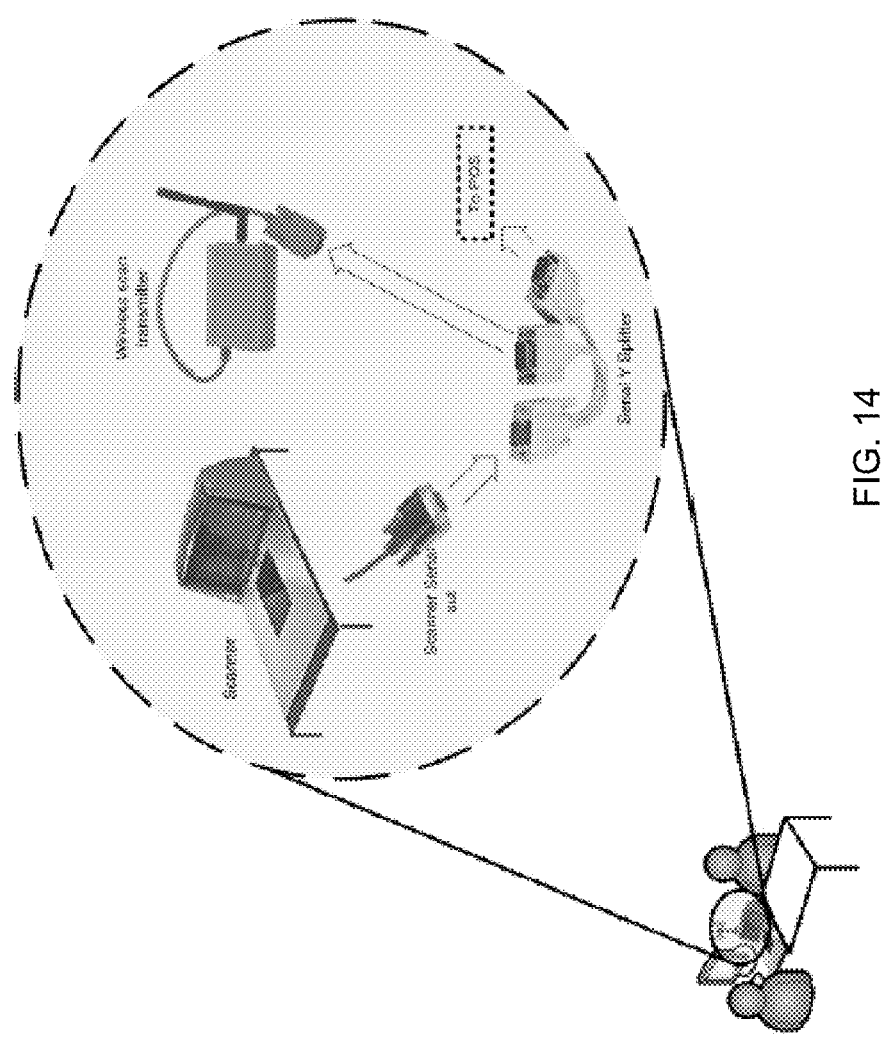
FIG. 14 is an example diagram illustrating implementation of a monitoring system according to embodiments herein.

FIG. 14 is an example diagram illustrating a detailed view of a wireless scan sensor according to embodiments herein. In an example embodiment, the scan sensor attaches to the output connector of each UPC scanner system in order to monitor the traffic for the detection of a scan event. When a scan event is detected, the transmitter transmits that info across the wireless network to a receiver 1030, which collects the scan event data in a timely fashion.

Another configuration is the reference implementation given in FIG. 14. In this embodiment, the scan data is transmitted wirelessly over a private, closed, secured 802.11-based wireless network. In the reference implementation, we use 802.11 due to its high availability, resulting in a very mature, stable wireless network. However, we note that any wireless connection of any kind can be used, with or without forming a network with similar devices, and we shall continue to refer to the reference embodiment, which uses 802.11 over RF, without loss of generality.

Here, the listener is similar to the listener 1010 in the reference implementation of the optical scan sensor. The listener 1010 is a small device that attaches to the scanner system via a Y-connector or any other type of connection that allows a signal to be observed without impeding the original flow of that signal. In this case, we can listen to the traffic to and from the scanner system without affecting its communication with the register. In other words, a splitter can be connected to the output port of the scanner. The scanner transmits scan data to a POS system. One connector in the Yamamoto splitter is connected to a wireless scan transmitter for monitoring of data from the scanner to the POS system. The data can indicate when the events occur.

In another embodiment, the listener 1010 can be a small microphone that listens for the auditory beep produced by the scanner system upon the successful scanning of an item.

The listener 1010 interprets the data output by the scanner system (or input to it) and, upon finding a signal indicative of a scan, sends an event to the transmitter 1020 with the relevant data.

The transmitter 1020 maintains an RF connection to a wireless router, based on the 802.11 standard and sends the events captured by the listener 1010 over the wireless connection.

The receiver 1030 can be a device, such as a personal computer running specific instructions, that is likewise connected to the router either wirelessly or otherwise, and maintains connections to the various transmitting devices. It is the receiver 1030's job to collect in a timely fashion the events sent by the transmitter 1020 and to mark the location within the video at which the various scan events occur. In this way, video and scan data is synchronized.

Unlike the optical approach described previously, which injects a scan signal directly into the video stream, we must assume synchronization of some sort between the receiving device and the video stream. In one embodiment, this is accomplished by having the receiving device (PC and associated instructions) also receive the associated video streams, thus alleviating the need for a further synchronization step between receiver 1030 and video stream. More sophisticated approaches to maintaining synchronization are possible, however, as discussed further in copending applications as referenced above.

Alternate Embodiment

The previous sections describe, in detail, configurations that capture relevant and timely scan information and transmit that information over various mediums. In this alternate embodiment, we show how the wireless device so described can be modified to operate across a suitable wired network. This has the advantage of being able to leverage if possible more of a store's existing infrastructure. Such networks that can be leveraged include, but are not limited to, a store's coaxial or Ethernet networks, as well as alternate wired networks, such as a store's electrical network or power lines.

For this alternate configuration, the transmitter 1020 maintains a wired connection, such as from a TCP/IP-based network, and sends the events captured by the listener 1010.

The receiver 1030 is a device, such as a personal computer running specific instructions, that is likewise connected to the network, and maintains connections to the various transmitting devices. It is the receiver 1030's job to collect in a timely fashion the events sent by the transmitter 1020 and to mark the location within the video at which the various scan events occur. In this way, video and scan data is synchronized Typical Data and Retrieval Strategies In this section, we describe the typical forms of data we extract from the scanner system using the reference implementations described previously and the strategies we use to summarize that data. We do so without loss of generality—these are examples only and it should be clear that they in no way limit the scope of the type of data extractable and covered by this patent.

In one embodiment, the data extracted from the scanner system is the universal product code UPC, or SKU number. This is typically written as a bar code on the side of an item and scanned by a laser scanner. The scanner system is most commonly a flat bed scanner, in which the item is moved across it to have its barcode read. The scanner system could also be a hand held scanner, in which the scanner is held by an operator and aimed at the barcode of the item to be scanned.

While different scanner manufacturers have different protocols through which they communicate the SKU to the register, the data itself almost universally includes the raw SKU itself.

In the reference implementation of the wireless scan sensor described above, the SKU itself is extracted and transmitted. When the message arrives at the receiver 1030, it is time stamped and a bookmark is added to the video stream in order to synchronize scan data with video.

In the reference implementation of the optical scan sensor, the SKU is not extracted. However, it is detected by the listener 1010, and a flash is transmitted, indicating the presence of the SKU. The receiver 1030, in turn, extracts the flash from the video data stream and bookmarks its location in order to synchronize scan data with video. Though not done in the reference implementation, as indicated in previous sections, the scan data itself could also be modulated and transmitted as well.

Weighed Data

Another common form of scan data comes from items requiring their weight to be known. Such items include produce, some deli items, and other "random weight" items that are purchased based on their weight rather than their quantity.

For weighed data, two different strategies are employed, based on the data coming from the weight scale itself. Some scales will stabilize their weight measurement before giving the result to the POS. In these cases, the listener 1010 extracts the weight from the output signal. In the wireless scan sensor, the weight is extracted and transmitted. When the message arrives at the receiver 1030, it is time stamped and a bookmark is added to the video stream in order to synchronize scan data with video. For the optical scan sensor, the weight is detected by the listener 1010 and a flash is transmitted, indicating that an item has been recorded. The receiver 1030, in turn, extracts the flash from the video stream and bookmarks its location in order to synchronize scan data with video.

Other times, the weight scale will send to the register a continuous stream of weight measurements. In these cases, the same data is transmitted using the same strategies described above. However, the process of extracting or detecting the presence of a weighed item differs. Sometimes, the POS may communicate its acceptance of the weight to the scanner itself. In these cases, the weight will be continuously extracted and will be locked in (detected or extracted) when the listener 1010 detects that the POS has sent its acceptance signal to the scale. Other times, the protocol will be that the scale continuously sends its weight measurement and the POS will silently accept it. In these cases, the listener 1010 will wait for the weight on the scale to stabilize and then lock in that value. The following strategy (and others) can be employed to detected weight stabilization:

1. Keep track of current weight measurement and previous weight measurement

2. If the percentage difference between measurement is sufficiently low, output that the weight has stabilized.

3. Otherwise, repeat with next weight measurement coming off of scale

There are several and more sophisticated methods of determining when or if a signal has stabilized. The above is offered as one method of detecting stability, but any other method of detecting stability may also be used.

It may be the case that for some strategies of weight stability detection, we detect that the weight has stabilized only after the fact. In these cases, one approach to getting a more accurate time of when the weight has been stabilized and, hence, a more accurate time of when an item is positioned for entry into the POS, is to maintain the time difference between when the detection of stability occurs and when it was first initiated. This time delta can be transmitted as well as the weight itself, allowing the receiver 1030 to compensate for the time between when it receives the message and when the weight event actually occurred.

Note again that techniques herein are well suited for correlating detected events with a location in video where the event occurred as described herein. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method comprising:
   receiving at an analyzer, from a first monitoring system, video of an environment in which an item is entered at a point of sale system;
   via a communication outputted from a second monitoring system that is an add-on device disposed in the environment to monitor communication signals in the environment where the item is entered, detecting an occurrence of at least one event associated with entering the item; and
   wherein the communication outputted from the second monitoring system is an optical signal produced by an optical radiation source controlled by the second monitoring system, the optical signal being generated by the optical radiation source in response to the second monitoring system detecting the occurrence of the at least one event associated with entering the item; and
   wherein the video of the environment as captured by the first monitoring system includes the optical signal generated by the optical radiation source;
   wherein the analyzer detects the optical signal indicating occurrence of the at least one event; and
   correlating the detected at least one event to a particular time in the video when the at least one event occurred.

2. The method as in claim 1, wherein detecting the occurrence includes:
   receiving the communication from the second monitoring system, the communication including a notification that the second monitoring system detected an audible tone produced by scanning of the item into a scanner system, the audible tone indicating that the item was recognized by the scanner system during the scanning.

3. The method as in claim 1, wherein detecting the occurrence of at least one event includes:
   receiving the communication from the second monitoring system, the communication from the second monitoring system including a notification, the notification indicating that the second monitoring system detected transmission of a message from a scanner system to the point of sale system.

4. The method as in claim 1, wherein detecting the occurrence of at least one event includes:
   receiving the communication from the second monitoring system, the communication from the second monitoring system including a notification indicating that the second monitoring system detected output of a message from the point of sale system based on scanning of the item at a scanner system.

5. The method as in claim 1, wherein detecting the occurrence of at least one event includes:
   receiving the communication from the second monitoring system, the communication from the second monitoring system including a notification, the notification indicating that the second monitoring system detected output of a message from the point of sale system.

6. The method as in claim 5, wherein the second monitoring system detects the message based on monitoring an output of a printer port of the point of sale system.

7. The method as in claim 5, wherein the second monitoring system detects the message based on transmission of the message from an output port of the point of sale system to a peripheral device associated with the point of sale system.

8. The method as in claim 1, wherein correlating the at least one event to the particular time in the video includes:
   generating a clock adjustment value based on a time difference between a first clock and a second clock, the first clock associated with the first monitoring system, the second clock associated with the second monitoring system;
   obtaining a timestamp from the received communication, the timestamp indicating a relative time with respect to the first clock when the at least one event occurred; and
   applying the clock adjustment value to the timestamp to identify a particular time relative to the second clock when the at least one event occurred.

9. The method as in claim 8, wherein generating the clock adjustment value comprises:
   monitoring a latency of a network over which a particular heartbeat communication is received from the second monitoring system;
   detecting that the latency of the network is below a threshold value based on the particular heartbeat communication; and
   utilizing time stamp information associated with at least one communication from the second monitoring system to generate the clock adjustment value, the clock adjustment value indicating an offset between the first clock and the second clock.

10. The method as in claim 1, wherein detecting the occurrence of the at least one event includes:
    receiving the communication from the second monitoring system, the communication including a notification that the second monitoring system detected the occurrence of the at least one event based on a signal produced by a scanner system as a result of scanning the item at the scanner system, the signal transmitted from the scanner system to the point of sale system for purchase of the item.

11. The method as claim 1 further comprising:
    storing the video in a repository;
    generating a clock adjustment value, the clock adjustment value indicating a time difference between a clock associated with the video and a clock associated with the second monitoring system;
    obtaining a timestamp from the communication, the timestamp indicating a time at which the second monitoring system detected the occurrence of the at least one event; and
    adjusting the timestamp by the clock adjustment value to correlate the at least one event to the particular time in the video;

wherein receiving the video includes receiving the video from a surveillance camera capturing the item being entered into the point of sale system, the video recorded according to a first clock associated with the surveillance camera, the second monitoring system generating the timestamp based on a second clock, clock adjustment value indicating a time skew between the first clock and the second clock.

12. The method as in claim 1, detecting the occurrence of the at least one event includes:
detecting motion associated with a person scanning the item by a scan window of a scanner system, the scan window configured to monitor the item for presence of a label associated with the item.

13. The method as in claim 1, detecting the occurrence of the at least one event associated with scanning of the item at the scanner system includes:
detecting absence of a customer presenting the item for entry into the point of sale system.

14. The method as in claim 1 further comprising:
receiving the communication from the second monitoring system over a variable latency network; and
receiving the video from a surveillance camera monitoring the scanning of the item at a scanner system.

15. A method comprising:
detecting, via an output from an event monitoring system, an occurrence of at least one event associated with entry of an item into a point of sale system, the event monitoring system being an add-on device that monitors communication signals generated in response to the entry of the item into the point of sale system;
in response to the occurrence of the at least one event, initiating activation of an optical radiation source to generate an optical signal, the optical signal indicating the occurrence of the at least one event;
via a video surveillance monitoring system, producing a video stream to include at least one image capturing the item being entered and the optical signal; and
via an analyzer, analyzing the video stream for the optical signal to identify a time in the video stream corresponding to the occurrence of the at least one event.

16. The method as in claim 15, wherein the optical radiation signal is infrared.

17. The method as in claim 15, wherein initiating activation of the optical radiation source includes modulating the optical signal.

18. The method as in claim 12, wherein the at least one event is one of multiple different types of events; and
wherein analyzing the video further includes decoding the optical signal in the video into bit information, the bit information indicating a particular type associated with the at least one event.

19. The method as in claim 15, wherein detecting the occurrence of at least one event includes:
detecting transmission of a message from a scanner system to the point of sale system.

20. The method as in claim 15, wherein detecting the occurrence of at least one event includes:
detecting output of a message from the point of sale system to which a scanner system is communicatively connected, the message generated by point of sale system based on scanning of the item at the scanner system.

21. The method as in claim 15, wherein detecting the occurrence of at least one event includes:
detecting an audible tone produced by a scanner system used to enter the item into the point of sale system, the audible tone indicating that the item was recognized by the scanner system during scanning of the item by the point of sale system.

22. The method as in claim 15, wherein detecting the occurrence of at least one event includes:
detecting conveyance of the item passed a scan window of a scanner system used to enter the item into the point of sale system.

23. A system comprising:
a processor;
a memory unit that stores instructions associated with an application executed by the processor; and
an interconnect coupling the processor and the memory unit, enabling the computer system to execute the application and perform operations of:
receiving at an analyzer, from a first monitoring system, video of an environment in which an item is entered into a point of sale system;
via a communication from a second monitoring system that is an add-on device monitoring signals in the environment in which the item is entered, detecting an occurrence of at least one event associated with entry of the item into the point of sale system; and
wherein the communication outputted from the second monitoring system is an optical signal produced by an optical radiation source controlled by the second monitoring system, the optical signal being generated by the optical radiation source in response to the second monitoring system detecting the occurrence of the at least one event associated with entering the item; and
wherein the video of the environment as captured by the first monitoring system includes the optical signal generated by the optical radiation source;
wherein the analyzer detects the optical signal indicating occurrence of the at least one event; and
correlating the detected at least one event to a particular time in the video where the at least one event occurred.

24. Computer-readable storage hardware having instructions stored thereon for processing data information, such that the instructions, when carried out by a processing device, cause the processing device to perform the operations of:
receiving at an analyzer, from a first monitoring system, video of an environment in which an item is entered into a point of sale system;
via a communication from a second monitoring system, detecting an occurrence of at least one event associated with entry of the item into the point of sale system, the second monitoring system being an add-on device that monitors signals locally outputted to the environment in which the item is entered; and
wherein the communication outputted from the second monitoring system is an optical signal produced by an optical radiation source controlled by the second monitoring system, the optical signal being generated by the optical radiation source in response to the second monitoring system detecting the occurrence of the at least one event associated with entering the item; and
wherein the video of the environment as captured by the first monitoring system includes the optical signal generated by the optical radiation source;
wherein the analyzer detects the optical signal indicating occurrence of the at least one event; and
correlating the detected at least one event to a particular time in the video where the at least one event occurred.

25. The method as in claim 1, wherein detecting the occurrence includes:

receiving the communication from the second monitoring system, the communication including a notification that the second monitoring system detected an output of a keyboard transmitted to the point of sale system, the output specifying the item being entered into the point of sale system.

26. The method as in claim 1, wherein the optical signal generated by the optical radiation source is infrared.

27. The method as in claim 1, wherein the optical signal generated by the optical radiation source is a modulated optical signal.

28. The method as in claim 27, wherein the at least one event is of a particular type amongst multiple different possible types of events, the method further comprising:

encoding the optical signal captured by the video as bit information indicating the particular type associated with the at least one event.

* * * * *